(12) United States Patent
Le et al.

(10) Patent No.: US 12,430,584 B2
(45) Date of Patent: Sep. 30, 2025

(54) SYSTEMS AND METHODS FOR PROGRAM SYNTHESIS

(71) Applicant: Salesforce, Inc., San Francisco, CA (US)

(72) Inventors: Hung Le, Singapore (SG); Yue Wang, Singapore (SG); Akhilesh Deepak Gotmare, Singapore (SG); Chu Hong Hoi, Singapore (SG)

(73) Assignee: Salesforce, Inc., San Francisco, CA (US)

( * ) Notice: Subject to any disclaimer, the term of this patent is extended or adjusted under 35 U.S.C. 154(b) by 487 days.

(21) Appl. No.: 17/896,942

(22) Filed: Aug. 26, 2022

(65) Prior Publication Data

US 2023/0376840 A1  Nov. 23, 2023

Related U.S. Application Data

(60) Provisional application No. 63/344,900, filed on May 23, 2022.

(51) Int. Cl.
| | | |
|---|---|---|
| G06F 9/44 | (2018.01) | |
| G06F 18/21 | (2023.01) | |
| G06F 18/214 | (2023.01) | |
| G06F 40/284 | (2020.01) | |
| G06F 40/289 | (2020.01) | |
| G06N 20/00 | (2019.01) | |

(52) U.S. Cl.
CPC ........... *G06N 20/00* (2019.01); *G06F 18/214* (2023.01); *G06F 18/217* (2023.01); *G06F 40/284* (2020.01); *G06F 40/289* (2020.01)

(58) Field of Classification Search
None
See application file for complete search history.

(56) References Cited

U.S. PATENT DOCUMENTS

| | | | |
|---|---|---|---|
| 11,797,839 B2 | 10/2023 | Norouzi et al. | |
| 11,941,373 B2* | 3/2024 | Deng | G06N 3/084 |
| 2002/0199168 A1 | 12/2002 | Namito et al. | |
| 2008/0072100 A1 | 3/2008 | Okada | |
| 2013/0219374 A1* | 8/2013 | Jain | G06F 8/30 |
| | | | 717/131 |
| 2018/0275967 A1 | 9/2018 | Mohamed et al. | |
| 2023/0176829 A1* | 6/2023 | Rahmani | G06F 40/40 |
| | | | 717/110 |
| 2023/0244452 A1 | 8/2023 | Li et al. | |
| 2023/0280989 A1 | 9/2023 | Cambronero Sánchez et al. | |

OTHER PUBLICATIONS

Wang et al., Automating Reinforcement Learning Architecture Design for Code Optimization, Association for Computing Machinery (Year: 2022).*

(Continued)

*Primary Examiner* — Insun Kang
(74) *Attorney, Agent, or Firm* — Haynes and Boone, LLP

(57) ABSTRACT

Embodiments described herein provide a reinforcement learning based framework engaging pretrained language models (LMs) for program synthesis tasks. Specifically, the framework adopts a training strategy that optimizes pretrained LMs for program synthesis tasks in an actor-critic approach.

20 Claims, 16 Drawing Sheets

(56) References Cited

OTHER PUBLICATIONS

Yang et al, Program Synthesis Guided Reinforcement Learning for Partially Observed Environments (Year: 2021).*
Bahdanau et al., An Actor-Critic Algorithm for Sequence Prediction (Year: 2017).*
Bunel et al., Leveraging Grammar and Reinforcement Learning for Neural Program Synthesis (Year: 2018).*
Abolafia et al., Neural Program Synthesis With Priority Queue Training (Year: 2018).*
Xu et al., Neural Program Synthesis by Self-Learning (Year: 2019).*
Shin et al., Synthetic Datasets for Neural Program Synthesis (Year: 2019).*
International Search Report and Written Opinion for PCT/US2023/022994, dated Aug. 8, 2023, 11 pages.
Elhattami, "Beyond Codex: A Code Generation Model That You Can Train", Towards Data Science, Nov. 23, 2021, Retrieved from the internet: URL:https://towardsdatascience.com/beyond- codex-a-code-generation-model-that-you-can -train--6ac9bdcba07f, pp. 1-18, XP93067829.
Sanchez-Stern et al., "Generating correctness proofs with neural networks", Proceedings of the 4th ACM Sigplan International Workshop on Machine Learning and Programming Languages, Acmpub27, New York, NY, USA, Jun. 15, 2020, pp. 1-10, XP058452215.
International Report on Patentability for PCT/US2023/022994, dated Nov. 7, 2024, 9 pages.
Non-Final Office Action for U.S. Appl. No. 17/896,946, dated Mar. 11, 2025.

* cited by examiner

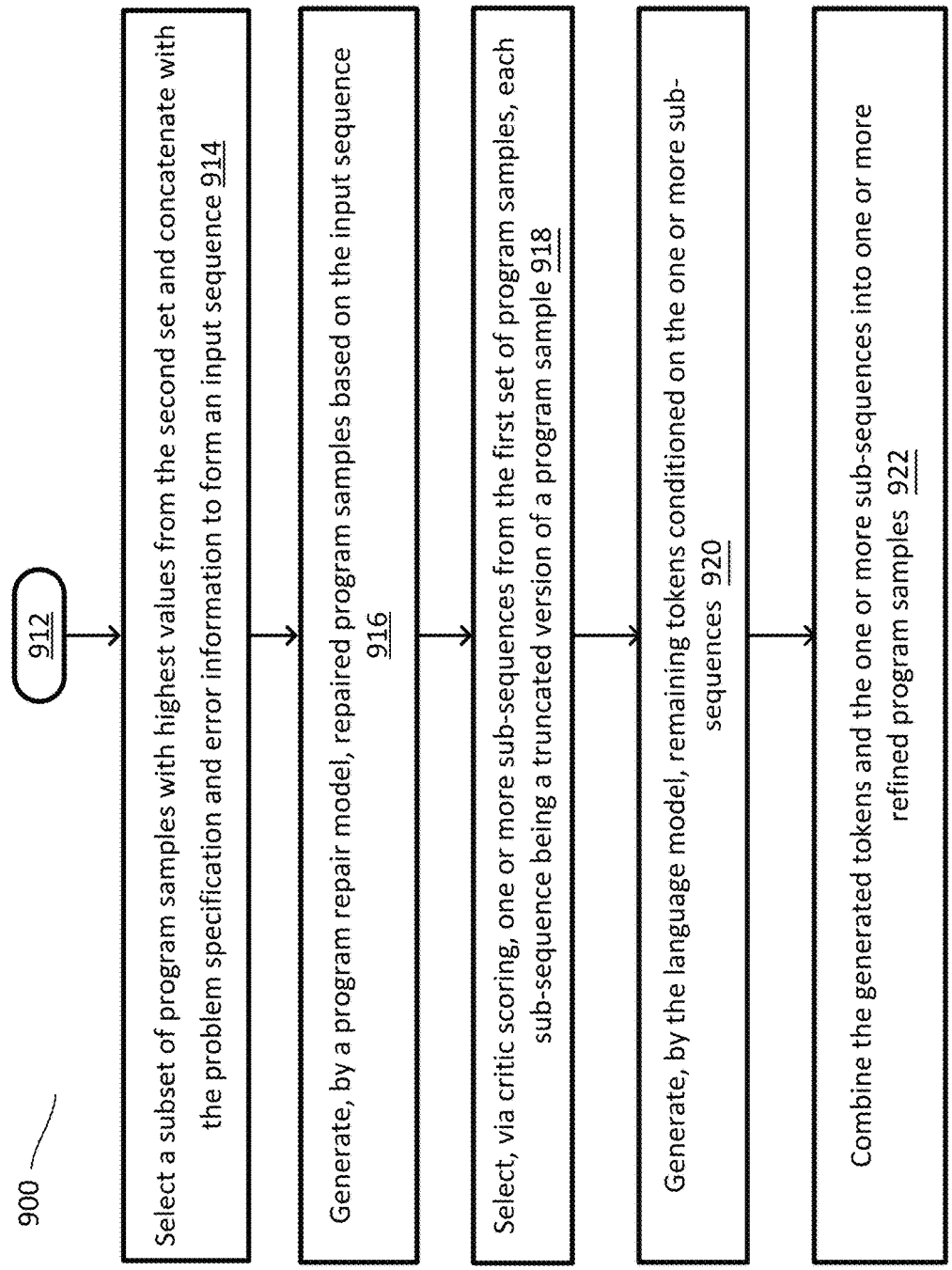
FIG. 9 (Cont')

(a) Performance by pass@k with k = {1, 5, 1000}

| Model | Size | pass@1 | | | pass@5 | | | pass@1000 | | |
|---|---|---|---|---|---|---|---|---|---|---|
| | | Intro | Inter | Comp | All | Intro | Inter | Comp | All | Intro | Inter | Comp | All |
| Codex | 12B | 4.14 | 0.14 | 0.02 | 0.92 | 9.65 | 0.51 | 0.09 | 2.25 | 25.02 | 3.70 | 3.23 | 7.87 |
| AlphaCode | 1B | - | - | - | - | - | - | - | - | 17.67 | 5.24 | 7.06 | 8.09 |
| GPT3 | 175B | 0.20 | 0.03 | 0.00 | 0.06 | - | - | - | - | - | - | - | - |
| GPT2 | 0.1B | 1.00 | 0.33 | 0.00 | 0.40 | 2.70 | 0.73 | 0.00 | 1.02 | 25.00 | 9.27 | 8.80 | 12.32 |
| GPT2 | 1.5B | 1.30 | 0.70 | 0.00 | 0.68 | 3.60 | 1.03 | 0.00 | 1.34 | 27.90 | 9.83 | 11.40 | 13.76 |
| GPT-Neo | 2.7B | 3.90 | 0.57 | 0.00 | 1.12 | 5.50 | 0.80 | 0.00 | 1.58 | 35.20 | 13.15 | 13.51 | 17.63 |
| GPT-J | 6B | 5.60 | 1.00 | 0.50 | 1.82 | 9.20 | 1.73 | 1.00 | 3.08 | - | - | - | - |
| CodeRL+CodeT5 | 770M | 7.08 | 1.86 | 0.75 | 2.69 | 16.37 | 4.95 | 2.84 | 6.81 | 40.00 | 15.67 | 17.90 | 20.98 |

(b) Performance by n@k with k up to 50000 and n = {1, 5}

| Model | Size | k | 1@k | | | | 5@k | | | |
|---|---|---|---|---|---|---|---|---|---|---|
| | | | Intro | Inter | Comp | All | Intro | Inter | Comp | All |
| Codex | 12B | 1000 | 22.78 | 2.64 | 3.04 | 6.75 | 24.52 | 3.23 | 3.08 | 7.46 |
| AlphaCode | 1B | 1000 | - | - | - | - | 14.36 | 5.63 | 4.58 | 7.17 |
| AlphaCode | 1B | 10000 | - | - | - | - | 18.18 | 8.21 | 6.65 | 9.89 |
| AlphaCode | 1B | 50000 | - | - | - | - | 20.36 | 9.66 | 7.75 | 11.42 |
| CodeRL+CodeT5 | 770M | 1000 | 17.17 | 6.78 | 4.88 | 8.48 | 25.61 | 9.53 | 8.91 | 12.62 |

FIG. 10

| # | $W^b$ | $q_\phi$ | pass@1 | | | | pass@5 | | | |
|---|---|---|---|---|---|---|---|---|---|---|
| | | | Intro | Inter | Comp | All | Intro | Inter | Comp | All |
| A | ✓ | - | 4.60 | 1.10 | 0.20 | 1.62 | 7.10 | 1.57 | 0.40 | 2.44 |
| B | - | ✓ | 4.00 | 0.87 | 0.20 | 1.36 | 5.60 | 1.30 | 0.20 | 1.94 |
| C | ✓ | dist. | 4.90 | 1.03 | 0.20 | 1.64 | 7.80 | 1.60 | 0.30 | 2.58 |
| D | ✓ | ✓ | 6.20 | 1.50 | 0.30 | 2.20 | 9.39 | 1.90 | 0.42 | 3.10 |

FIG. 11

| $\mathcal{L}_{ce}$ | $\mathcal{L}_{rl}$ | pass@1 | | | | pass@5 | | | |
|---|---|---|---|---|---|---|---|---|---|
| | | Intro | Inter | Comp | All | Intro | Inter | Comp | All |
| \multicolumn{10}{c}{GPT-Neo} | | | | | | | | | |
| - | - | 3.90 | 0.57 | 0.00 | 1.12 | 5.50 | 0.80 | 0.00 | 1.58 |
| ✓ | - | 2.70 | 0.90 | 0.10 | 1.10 | 5.00 | 1.43 | 0.30 | 1.92 |
| ✓(+$W^s$) | - | 2.90 | 0.80 | 0.30 | 1.12 | 5.20 | 1.57 | 0.40 | 2.06 |
| - | ✓ | 3.30 | 0.80 | 0.20 | 1.18 | 5.30 | 1.57 | 0.20 | 2.04 |
| ✓ | ✓ | 4.70 | 0.73 | 0.30 | 1.44 | 6.58 | 1.54 | 0.18 | 2.28 |
| \multicolumn{10}{c}{CodeT5-770M} | | | | | | | | | |
| - | - | 6.60 | 1.03 | 0.30 | 2.00 | 8.80 | 1.67 | 0.70 | 2.90 |
| ✓ | - | 4.60 | 0.93 | 0.10 | 1.50 | 7.00 | 1.37 | 0.20 | 2.26 |
| ✓(+$W^s$) | - | 5.10 | 1.10 | 0.40 | 1.76 | 8.30 | 1.43 | 0.70 | 2.66 |
| - | ✓ | 5.00 | 0.90 | 0.50 | 1.64 | 7.60 | 1.53 | 0.60 | 2.56 |
| ✓ | ✓ | 6.20 | 1.50 | 0.30 | 2.20 | 9.39 | 1.90 | 0.42 | 3.10 |

FIG. 12

| Model | Size | pass@80 |
|---|---|---|
| GPT | 224M | 7.2 |
| GPT | 422M | 12.6 |
| GPT | 1B | 22.4 |
| GPT | 4B | 33.0 |
| GPT | 8B | 40.6 |
| GPT | 68B | 53.6 |
| GPT | 137B | 61.4 |
| CodeRL+CodeT5 (ZS) | 770M | 63.0 |

Input Problem

QUESTION:
Holidays have finished. Thanks to the help of the hacker Leha, Noora managed to enter the university of her dreams which is located in a town Pavlopolis. It's well known that universities provide students with dormitory for the period of university studies. Consequently Noora had to leave Vičkopolis and move to Pavlopolis. Thus Leha was left completely alone in a quiet town Vičkopolis. He almost even fell into a depression from boredom!

Leha came up with a task for himself to relax a little. He chooses two integers A and B and then calculates the greatest common divisor of integers "A factorial" and "B factorial". Formally the hacker wants to find out GCD(A!, B!). It's well known that the factorial of an integer x is a product of all positive integers less than or equal to x. Thus x! = 1·2·3·...·(x - 1)·x. For example 4! = 1·2·3·4 = 24. Recall that GCD(x, y) is the largest positive integer q that divides (without a remainder) both x and y.

Leha has learned how to solve this task very effective. You are able to cope with it not worse, aren't you?

-----Input-----

The first and single line contains two integers A and B (1 ≤ A, B ≤ 10^9, min(A, B) ≤ 12).

-----Output-----

Print a single integer denoting the greatest common divisor of integers A! and B!.

-----Example-----
Input
4 3

Output
6

-----Note-----

Consider the sample.

4! = 1·2·3·4 = 24. 3! = 1·2·3 = 6. The greatest common divisor of integers 24 and 6 is exactly 6.
Use Standard Input format

ANSWER:

Example Unit Tests

Input: 4 3
Output: 6

Hidden Unit Tests

Input: 10 399653098
Output: 3628800

Input: 5 5
Output: 120
...

Ground-truth Program

```
1  a, b = map(int, input().split())
2  a = min(a, b)
3  ans = 1
4  for i in range(1, a + 1):
5      ans *= i
6  print(ans)
```

CodeT5 Output Program

```
1  from math import gcd
2  a, b = map(int, input().split())
3  c = math.gcd(a, b)
4  print(c)
```

Example tests: Failed
Hidden tests: Failed

CodeRL+CodeT5 Output Program (before CS)

```
1  from math import gcd
2  a, b = list(map(int, input().split()))
3  gcd = lambda x, y: x if y == 0 else gcd(y, x % y)
4
5  a_prod = 1
6  b_prod = 1
7  for i in range(1, a + 1):
8      a_prod *= i
9  for i in range(1, b + 1):
10     b_prod *= i
11
12 print(gcd(a_prod, b_prod))
```

Example tests: Passed
Hidden tests: RuntimeError (TimeOut)

CodeRL+CodeT5 Output Program (after CS)

```
1  from math import gcd
2  a, b = list(map(int, input().split()))
3  gcd = lambda x, y: x if y == 0 else gcd(y, x % y)
4
5  a_prod = 1
6  b_prod = 1
7  for i in range(1, min(a, b) + 1):
8      a_prod *= i
9      b_prod *= i
10
11 print(gcd(a_prod, b_prod))
```

Example tests: Passed
Hidden tests: Passed

*FIG. 20*

SYSTEMS AND METHODS FOR PROGRAM SYNTHESIS

CROSS REFERENCE(S)

The instant application is a nonprovisional of and claims priority under 35 U.S.C. 119 to U.S. provisional application No. 63/344,900, filed May 23, 2022, which is hereby expressly incorporated herein by reference in its entirety.

The instant application is related to U.S. nonprovisional application Ser. No. 17/896,946, filed on Aug. 26, 2022, which is hereby expressly incorporated herein by reference in its entirety.

TECHNICAL FIELD

The embodiments relate generally to machine learning systems, and more specifically to systems and methods for program synthesis through pretrained models and deep reinforcement learning.

BACKGROUND

Program synthesis, also commonly referred to as code generation, is a task to generate a computer code program that satisfies a problem specification, e.g., sorting a list, merging two data tables, and/or the like. When the program synthesis is treated as a sequence-to-sequence task, some pretrained language models may be adapted to receive an input sequence as problem specification in natural language and then generate a sequence of codes as an output program. However, these existing language models may have limited code generation performance, because these models often follow a standard supervised fine-tuning procedure to train a program synthesis model from natural language problem descriptions and ground-truth programs only. Such paradigm largely ignores some important but potentially useful signals in the problem specification such as unit tests, resulting in poor performance when solving complex unseen coding tasks.

Therefore, there is a need for an efficient and accurate program synthesis model.

BRIEF DESCRIPTION OF THE DRAWINGS

FIGS. 10-19 are example data tables or charts illustrating example performance comparison of the program synthesis framework described in FIGS. 1-9 and various baseline models, according to some embodiments described herein.

FIG. 20 shows an example of a programming problem and corresponding programs generated by the program synthesis framework described in FIGS. 1-9 and various baseline models, according to some embodiments described herein.

Figure 1:
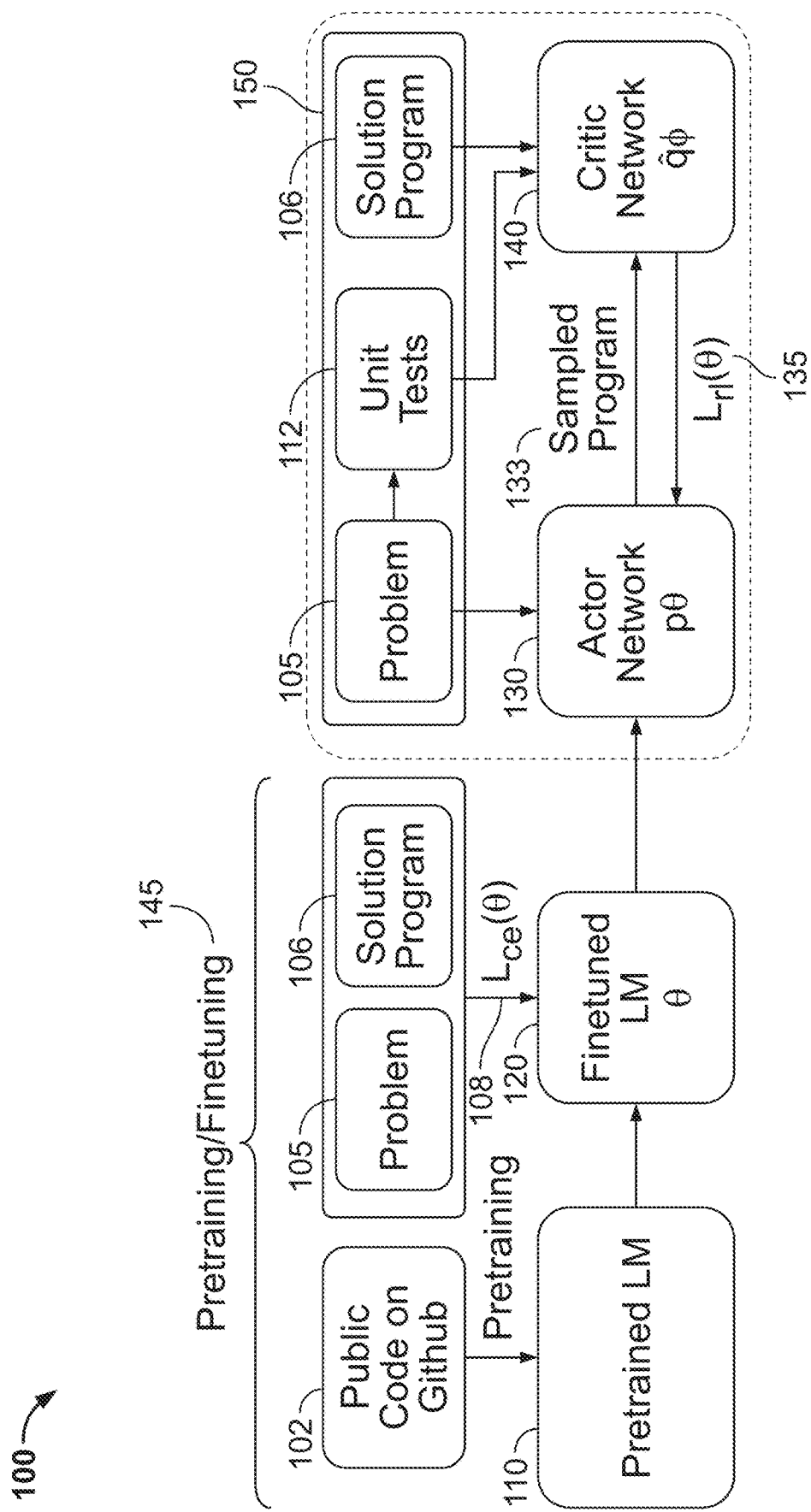
FIG. 1 is a simplified block diagram illustrating an example architecture employing an actor-critic framework to optimize pretrained language models (LMs) (and finetuned LM) for program synthesis, according to embodiments described herein.

In the figures, elements having the same designations have the same or similar functions.

DETAILED DESCRIPTION

As used herein, the term "network" may comprise any hardware or software-based framework that includes any artificial intelligence network or system, neural network, or system and/or any training or learning models implemented thereon or therewith.

As used herein, the term "module" may comprise hardware or software-based framework that performs one or more functions. In some embodiments, the module may be implemented on one or more neural networks.

Existing language models that can be used for program synthesis are often trained using a conventional next-token prediction (NTP) objective which maximizes the next ground-truth token likelihood. Training models only with next-token prediction objective in a "teacher-forcing" manner often leads to accumulating errors during test time when tokens are generated by conditioning on previously sampled tokens, not the ground-truth tokens. This issue becomes more serious in the domain of program synthesis, where existing token-matching scores such as BLEU may have failed to measure the functional correctness of complete programs.

In addition, existing language models may fail to utilize the potential meaningful signals from unit tests, which directly determine the model performance by the functional correctness of programs. Current approaches neglect this important signal during model optimization as well as generation procedure.

In view of the issues in existing program synthesis models, embodiments described herein provide a reinforcement learning based framework engaging pretrained language models (LMs) for program synthesis tasks. Specifically, a pretrained LM (e.g., pretrained with public code data, etc.) may be finetuned for program synthesis tasks on a pair of natural language problem description and a corresponding solution program. The finetuned LM may then act as an actor network, which synthetically sample sequences generated from this actor to form a sampled program in response to an input of the same problem description, including both correct and incorrect programs. These program samples are passed to a critic model, which is trained as an error predictor to predict a test outcome of an input program given a unit test, to determine a return that assesses the functional correctness of these program samples. The return generated from the critic model is then used to compute a policy gradient to minimize the (negative of) the expected return. The actor network is then finetuned based on the policy gradient.

In this way, the pretrained LMs are finetuned for program synthesis tasks in a reinforcement learning manner. For example, the pretrained parameters of the LM may act as a stochastic policy of the actor network, according to which an action may be generated as a prediction of each token for the output program. The pretrained LM (actor network) receives a return measured by the functional correctness of the generated program, and the goal of reinforcement learning is to minimize the expected return.

In one embodiment, during inference, the finetuned LM through the RL framework may be used to generate one or more code programs in response to a natural language problem description. To improve the correctness and accuracy of the resulting programs, a programming refining procedure and/or a program repairing procedure may be optionally employed to refine and/or repair the generated programs based on the functional correctness of the generated programs during test time. Specifically, example unit tests and a critic model are adopted to filter and select "pass" programs (that pass the unit tests) and "failed" programs (that fail the unit tests) from the LM-generated programs, respectively.

The "pass" programs can then be used to refine the program generation: sub-sequences from the "pass" programs are used as "seeds" which initializes and conditions the LM model to resample new tokens and obtain new output programs, e.g., to generate subsequent tokens following the "seeds" to form an output program. In this way, the re-generated program which is already conditioned on "pass" sub-sequences may yield a high likelihood of passing unit tests.

The "failed" programs can be used for repair the program generation. Among the "failed" programs, programs that have relatively higher likelihood of passing unit tests (compared to other "failed" programs) may be selected. These selected program candidates are concatenated with the respective error information (e.g., whether the "failed" program failed to compile, to execute, or to generate correct testing results, or whether a specific error occurred such as syntax error, etc.). A program repair module may receive the concatenated input and generate an output code program. In this way, the re-generated (repaired) program is generated based on information of possible prior errors, and thus may have a higher likelihood to be "repaired" and pass unit tests.

FIG. 1 is a simplified block diagram illustrating an example architecture 100 employing an actor-critic framework 150 to optimize pretrained LMs 110 (and finetuned LM 120) for program synthesis, according to embodiments described herein. In one embodiment, the architecture 100 comprise the pretraining/finetuning part 145 of one or more LMs 110 and the actor-critic framework 150. Specifically, program synthesis tasks may be formulated as a reinforcement learning (RL) problem such that the actor-critic framework 150 may apply an actor-critic RL approach to improve the performance of a pretrained LM 120 that is finetuned for program synthesis from the pretraining/finetuning stage 145.

In one embodiment, at stage 145, an LM 110 may first be pretrained on public code data (e.g., from Github) 102. For example, the LM 110 may comprise a Transformer model as the backbone of the program synthesis system described herein. One example of such pretrained LMs 110 may be a multi-lingual code-aware language model pretrained on large-scale source code corpora curated from Github, such as CodeT5 described in co-pending and commonly-owned U.S. nonprovisional application Ser. No. 17/450,968, filed Aug. 27, 2021, which is hereby expressly incorporated by reference herein in its entirety.

In one embodiment, public code data 102 may comprise a Python pretraining dataset such as the Github Code dataset. The public code data 102 may have compiled public, non-personal Information from GitHub consisting of permissively licensed Python code (e.g. "mit", "apache-2", "bsd-3-clause", "bsd-2-126 clause", "cc0-1.0", "unlicense", "isc"). The resulting Python dataset (GCPY) has 10.5B tokens and is 10× larger than the CodeSearchNet (CSN) corpus used in the original CodeT5 pretraining.

In one embodiment, the LM 110 may be pretrained with pretraining tasks similar t those used with CodeT5 like masked span prediction (MSP). While the MSP task benefits code understanding, they have a large discrepancy with program synthesis objectives. To mitigate this gap, a pretraining task of next-token prediction (NTP) may be used in pretraining the LM 110. Specifically, a pivot location is uniformly sampled for each code sample, and then the content preceding the pivot is passed to the encoder of LM 110 and remaining to the decoder of LM 110. To control the length of input and output sequences, the pivot may be restricted within 10% to 90% of the original sequence.

After pretraining, the pretrained LM 110 may then be finetuned for specific program synthesis tasks. Following a sequence-to-sequence approach, a program synthesis training pair of a natural language problem description 105, which take a form of an input sequence D, and a corresponding solution code program 106 may be used to finetune the pretrained LM 110. In response to the input sequence D, the pretrained LM 110 may generate an output sequence of program $\hat{W}=(\hat{w}1, \ldots, \hat{w}_T)$, $\hat{w}_t \in \mathcal{V}$ that can solve the problem. The output at each decoding step t is a distribution over the vocabulary $\mathcal{V}$, computed by the softmax function $\hat{w}_t \sim \text{softmax}(\text{Linear}(s_t))$ where $s_t$ is the contextual hidden state at decoding step t.

Thus, the model parameters, θ, of the pretrained LM 110 may be finetuned, during train time, maximizing the likelihood of the ground-truth reference programs. Specifically, denoting $W=(w_1, \ldots, w_T)$ as the ground-truth program, the objective is to minimize the cross-entropy loss 108:

$$\mathcal{L}_{ce}(\theta) = -\Sigma_t \log p_\theta(W|D) = -\Sigma_t \log [p_\theta(w_t|w_{1:t-1},D)], \quad (1)$$

where the conditional probability $p_\theta$ is parameterized following the above softmax function. During inference time, models may generate sequences of programs by autoregressively sampling token $\hat{w}_t$ from the conditional distribution $p_\theta(w_t|\hat{w}_{1:t-1},D)$.

In one embodiment, the finetuned LM 120 are evaluated against unit tests 112 corresponding to the problem description. Each test includes a pair of input and ground-truth output. In some example real-world program synthesis tasks, example unit tests are often given as parts of the problem specification.

In one embodiment, the finetuned LM 120 is then passed to the actor-critic framework 150, to act as an actor network 130. Specifically, the learned parameters of the finetuned LM model 120, θ, may be viewed as a stochastic policy, which decides an action as the prediction of each token in the sampled program 133, in response to an input of the problem description 105. Following each action, the LM model 120 (or synonymously the actor network 130) updates its hidden state representations which are used by the policy to determine the next action in the next decoding step. The generated tokens of the sampled program 133 may be sent to a critic network 140. At the end of the generation episode (i.e. an <endoftext> token is observed), the actor network 130 receives a return r measured by the critic network 140 based on the functional correctness of the generated program 133.

Specifically, for each synthetic sample sequence $W^s = (w_1^s, \ldots, w_T^s)$ in which each token $w_t^s$ is sampled by the actor network 130 at decoding time step t, the critic network 140 may determine the return by checking its functional correctness. On one hand, the problem description 105 is associated with one or more unit tests 112, which contains example testing inputs and corresponding outputs that solve the problem description 105. On the other, the generated programs 133 together with the corresponding unit tests 112 are also passed to a compiler. The generated program 133 is then compiled and execute with a testing input from the unit tests 112 to generate an execution result. From the outputs of execution, the return r may be determined depending on whether the synthetic sample sequence $W^s$ may be compiled and executed at all, and if successfully executed, whether the execution result matches with the testing output in the unit tests 112:

$$r(W^s) = \begin{cases} -1.0, & \text{if } W^s \text{ cannot be compiled (i.e. compile error)} \\ -0.6, & \text{if } W^s \text{ cannot be excuted with unit tests (i.e. runtime error)} \\ -0.3, & \text{if } W^s \text{ failed any unit tests} \\ +1.0, & \text{if } W^s \text{ passed all unit tests} \end{cases} \quad (2)$$

The determined reward r may then be used to compute a reinforcement learning training objective, which is to minimize the expected return 135:

$$\mathcal{L}_{rl}(\theta) = -\mathbb{E}_{W^s \sim p_\theta}[r(W^s)]. \quad (3)$$

To update the actor network 130 (equivalently, the finetuned LM 120), an estimate of the policy gradient $\nabla_\theta \mathcal{L}_{rl}(\theta)$ of the non-differentiable return r is computed as:

$$\nabla_\theta \mathcal{L}_{rl}(\theta) \approx -\mathbb{E}_{W^s \sim p_\theta}[r(W^s) \nabla_\theta \log p_\theta(W^s \mid D)] \quad (4)$$
$$\approx -\mathbb{E}_{W^s \sim p_\theta}\left[r(W^s) \sum_t \nabla_\theta \log[p_\theta(w_t^s \mid w_{1:t-1}^s, D)]\right].$$

The computed estimated policy gradient may then be used to update the actor network 130.

In one embodiment, a "baseline" program may be adopted in the RL training of the actor network 130. Specifically, a greedy decoding strategy may be used as a baseline and any generated samples 133 that outperform this baseline are given positive return estimation, and negative return estimation otherwise. This relative normalization technique allows models to explore imperfect programs, as long as their returns are better than the baseline's. In other words, given a problem description 105, a baseline program sample sequence Wb may be generated using a baseline model. The return of the baseline $r(W^b)$ may be determined in a similar manner as $r(W^s)$, and the expected gradient estimate may be computed to reflect whether the sampled program sequence outperforms the baseline program sequence by comprising the respective rewards:

$$\nabla_\theta \mathcal{L}_{rl} = -\mathbb{E}_{W^s \sim p_\theta}[(r(W^s) - r(W^b)) \Sigma_t \nabla_\theta \log[p_\theta(w_t^s \mid w_{1:t-1}^s, D)]]. \quad (5)$$

At each decoding step t, the greedy decoding baseline is independent from the action $w_t^s$ generated by the actor network 130. Hence the expected gradient term computed with the baseline reward remains the same as that computed without the baseline reward. However, in this way, by brining the baseline reward term, high variance in gradient estimate with mini-batches in training may be avoided.

Figure 2:
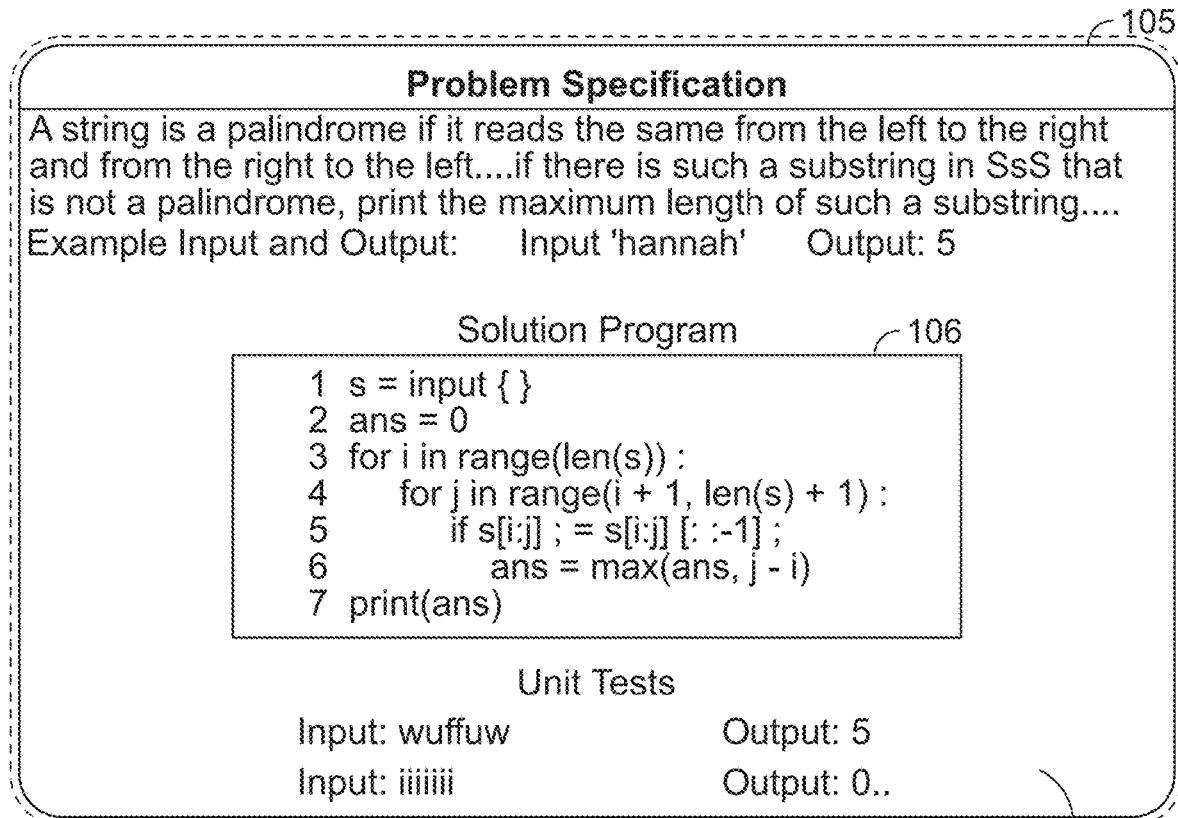
FIG. 2 is a simplified block diagram illustrating an example program synthesis task, according to one embodiment described herein.

FIG. 2 is a simplified block diagram illustrating an example program synthesis task, according to one embodiment described herein. As shown in FIG. 2, an example program synthesis task comprises a problem specification 105 in natural language, describing a problem to "print the maximum length of such a substring" that "is not a palindrome." The corresponding solution program 106 comprises a code segment that solves the problem described in the specification 105. The unit tests 112 may contain example input-output testing pairs corresponding to the problem specification 105, e.g., when Input="wuffuw," the output (e.g., maximum length of a substring that is not a palindrome)=5.

Pretrained language models (LMs 120) can be adapted to receive input sequences as problem specification 105 in natural language and generate a sequence of codes as the output program. When the problem specification 105 is passed to a code generator (such as a pretrained and finetuned LM 130), the expected output is a program to be checked for functional correctness against the unit tests 112.

Figure 3:
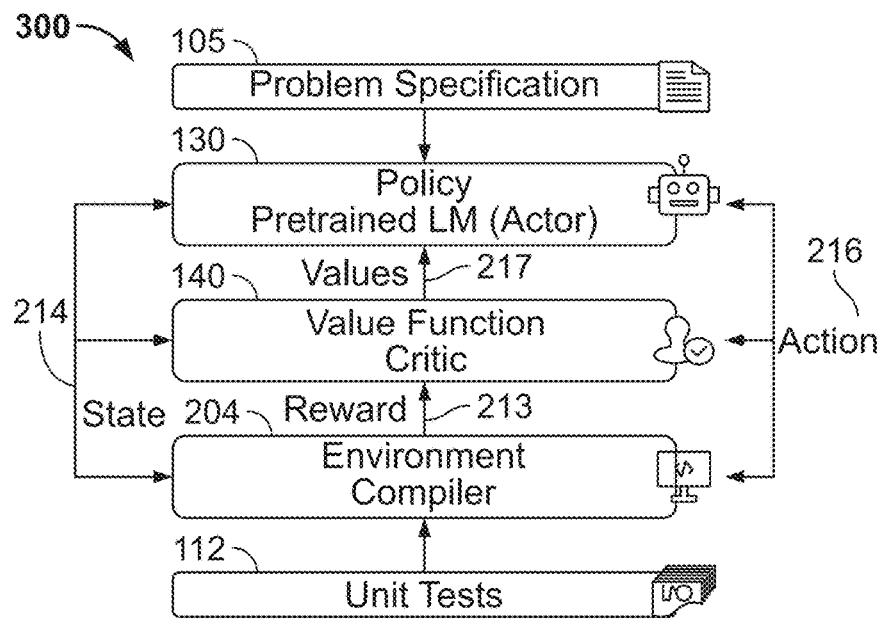
FIG. 3 is a simplified block diagram illustrating an example of the reinforcement learning based program synthesis framework for an example program synthesis task, according to one embodiment described herein.

FIG. 3 is a simplified block diagram illustrating an example of the reinforcement learning based program synthesis framework 300 for an example program synthesis task, according to one embodiment described herein. The RL-based program synthesis framework 300 depicts the dynamics in the actor-critic framework 145 in FIG. 1 in an RL manner. Specifically, in the RL network 300, the finetuned LM may serve as an actor, which decides an action 216 as the prediction of each token in an output program sequence in response to an input of the problem specification 105, according to the learned parameters of the finetuned LM model $\theta$, i.e., the policy. The action 216 may then be sent to the critic network 140, which serves as a value function to compute values 217 (e.g., the policy gradient) based on the current action 216, to update the actor 130. A compiler 204 may serve as the environment of the actor 130 and the critic 140, which receives the action 216 and generates a reward 213, e.g., by compiling and executing the sampled program sequence composed of predicted tokens (actions 216) from the actor 130 and comparing the execution result with unit tests 112. The running states 214 of the environment (compiler 204) may be shared with the actor 130 and the critic 140 to each make their respective predictions.

Figure 4:
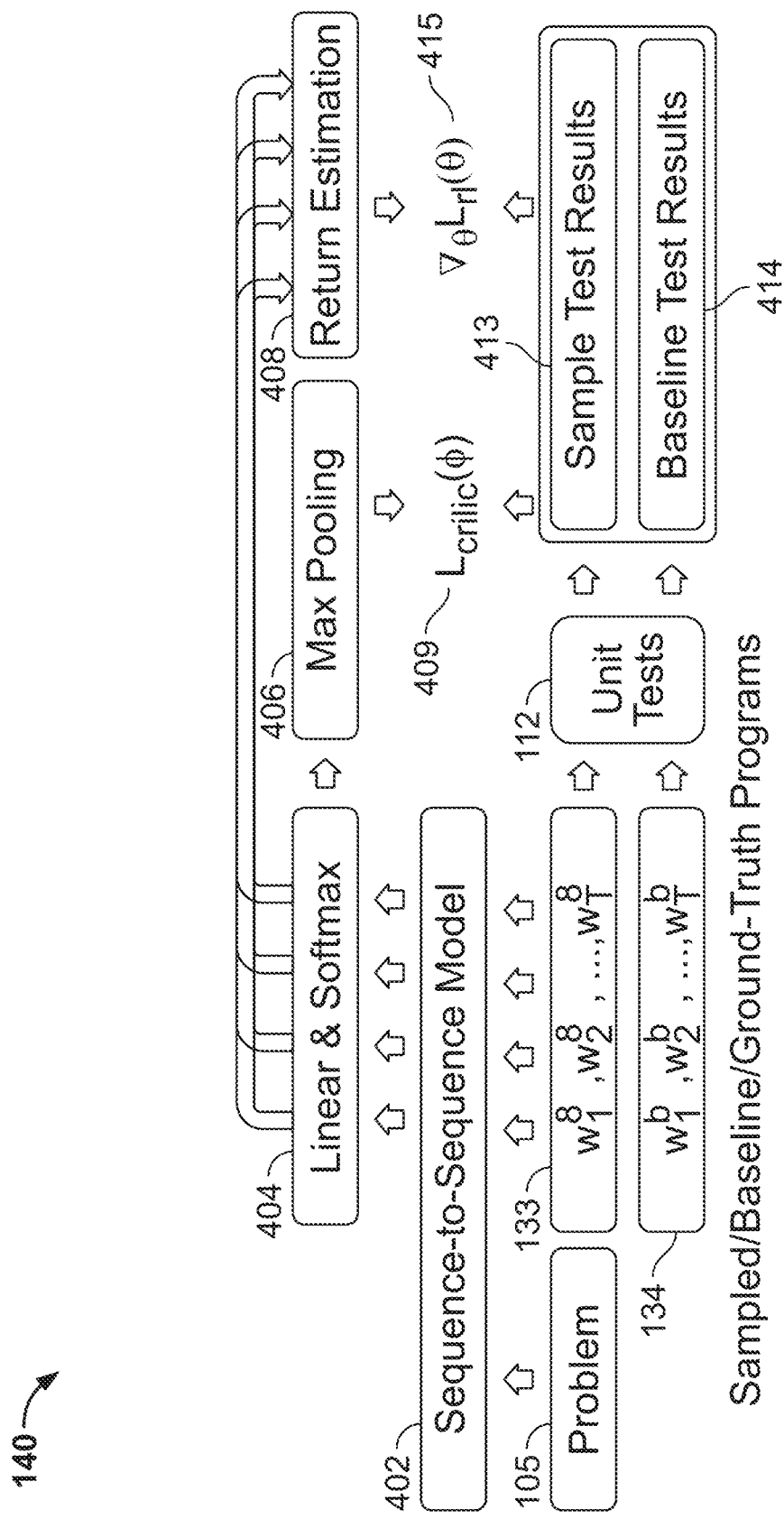
FIG. 4 is a simplified block diagram illustrating an example training procedure of the critic network in FIG. 1, according to embodiments described herein.

FIG. 4 is a simplified block diagram illustrating an example training procedure of the critic network 140 in FIG. 1, according to embodiments described herein. The critic model 140 comprises a sequence-to-sequence model 402, a linear and softmax operator 404, a max pooling module 406, and a return estimation module 408.

In one embodiment, the critic model 140 is parameterized as a neural network with parameters $\Phi$ that receives inputs as the problem description D 105 and a sampled program $W^s = (w_1^s, \ldots, w_T^s)$ 133 from the actor network 130 in FIG. 1. The critic model may be trained an error predictor, which receives problems specifications 105 and programs 133 or 134 as input sequences and then predicts one of four possible test outcomes {CompileError; RuntimeError; FailedTest; PassedTest} as described in relation in the reward definition.

For example, the critic model 140 may comprise Transformer models of smaller sizes than the actor model 130 as the base architecture, i.e., a sequence-to-sequence model 402. The contextual hidden states of the program tokens $\{h_1, \ldots, h_T\}$ obtained from the critic model decoder are passed to a linear layer 404 and then max-pooled along the sequence length dimension via the max-pooling layer 206:

$$h^{pool} = \text{Pooling}(\text{Linear}(h_1), \ldots, \text{Linear}(h_T)). \quad (6)$$

The critic's prediction on the unit test outcome is then computed as $$\hat{u} = \text{softmax}(h^{pool}). \quad (7)$$

In this way, the training objective 409 of the critic model 130 parameters $\Phi$ may be computed as a cross-entropy loss between the predicted unit test outcome from the max-pooling layer 406 of the critic model 130 and the ground-truth unit test outcome 413:

$$\mathcal{L}_{critic}(\phi) = -\log p_\phi(u|W^s, D). \quad (8)$$

Here, u denotes the ground-truth unit test outcome 413 given by the compiler after passing sampled program sequence $W^s$ 133 to the unit tests 112 corresponding to the problem. The computed training objective $\mathcal{L}_{critic}(\phi)$ is then used to update the critic model 140 (e.g., the maxpooling layer 406, the linear and softmax operator 404 and the sequence-to-sequence model 402) via backpropagation.

After training the critic model 140, the probability distribution $\hat{v}_t = \text{softmax}(\text{Linear}(h_t))$ may be used to estimate the token-level value $\hat{q}$ of $w_t^s$ in relation to the ground-truth unit test output (note that token-level contextual representation ht is used here, before the pooling operation). Specifically, the return estimation module 408 may obtain the $\hat{v}_t = \text{softmax}(\text{Linear}(h_t))$ from the linear and softmax operator 404, and compute $\hat{q}_\phi = \hat{v}_t[u]$ where $\hat{v}[\ ]$ denotes the probability of a specific unit test outcome from the four possible ones.

In some embodiments, to improve and stabilize the training process, baseline programs 134 are considered, e.g., by passing to the unit tests 112 to generate baseline test results 414. In this way, relative returns are generated by comparing the sample test results 413 and baseline test results 414. Specifically, the return estimation module 408 may then compute the policy gradient based on intermediate returns (with baseline test results 414 generated by passing the baseline program sequence 134 to the unit test 112):

$$\nabla_\theta \mathcal{L}_{rl}(\theta) \approx -\mathbb{E}_{W^s \sim p_\theta}[r(W^s) - r(W^b)) \Sigma_t \hat{q}_\phi(w_t^s) \nabla_\theta \log[p_\theta (w_t^s | w_{1:t-1}^s, D)]]. \quad (9)$$

It is noted that as the critic model 130 is trained in a supervised learning environment with available ground truth, the training samples may include perfect (ground-truth) output programs W, e.g., the solution programs 106. These programs may be assigned with the default test outcome u=PassedTest to train the critic model 140.

In one embodiment, imitation learning may be adopted to first warm-start a pretrained LM model 110 with Lce only for up to 10 epochs. Sampled program sequences are then obtained from this actor network 130 to train the critic model 140 while keeping the parameters of the actor network 130 frozen. For example, when the actor network is a CodeT5 actor model, the CodeT5-small architecture can be used for the critic model 140, and GPT2-small critic architecture for the critic model 140 when the actor models are GPT variants.

In one embodiment, in addition to synthetic programs 133, ground-truth programs 106 of training samples may also be used to train the critic network 140. These samples are considered perfect programs and always have a label of PassedTest. After training the critic, both Lce and Lrl are applied with equal weights to finetune the actor network 130. To optimize the LM actor network 130, in each training optimization step, the expected gradient may be approximated with a single sample $W_s \cdot p_\theta$:

$$\nabla_\theta \mathcal{L}_{rl}(\theta) \approx -(r(W^s) - r(W^b)) \sum_t \hat{q}_\phi(w_t^s) \nabla_\theta \log[p_\theta(w_t^s | w_{1:t-1}^s, D)]$$

Figure 5:
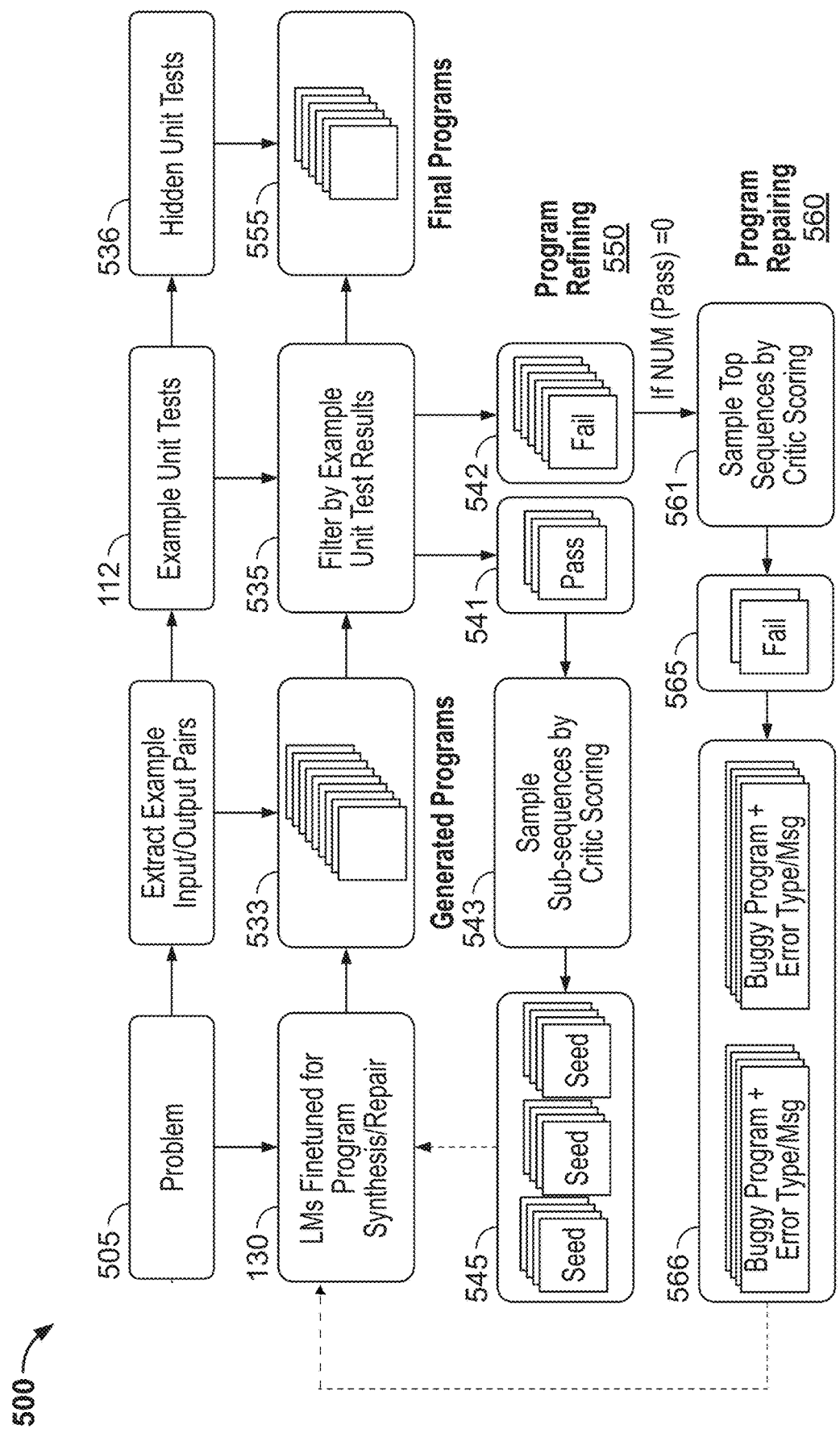
FIG. 5 is a simplified block diagram illustrating a Critic Sampling (CS) framework for program synthesis using the trained LM (actor network) from FIG. 1 during inference, according to embodiments described herein.

FIG. 5 is a simplified block diagram illustrating a Critic Sampling (CS) framework 500 for program synthesis using the trained LM (actor network 130) from FIG. 1 during inference, according to embodiments described herein. The LM 130 finetuned for program synthesis tasks from FIG. 1 may be used for generating, refining and repairing programs based on their results on example unit tests of the corresponding problems. Specifically, a dual strategy comprising a program repairing procedure 560 and a programming refining procedure 550 (referred to as "Critic Sampling" (CS)) may be implemented to generate and improve programs during inference, both from success cases (program refining), and from failure cases (program repairing). The program refining procedure 550 and/or the program repairing procedure 560 may each be optionally implemented (as illustrated by the dotted line in FIG. 5), or implemented together, after the LM 130 generates output programs 533.

In one embodiment, a testing problem description 505 may be received at the finetuned LM 130 at inference stage. Example unit test input-outputs provided in the input problem description 505 may be used to improve the generation procedure during inference. For example, example input-output pairs may be extracted from the problem description 505 to form example unit tests 112.

For each problem description 505, the finetuned LM 130 may generate N programs 533. Each of the generated programs 533 may then be passed to example unit tests that are often embedded as parts of problem specifications 505. Specifically, the generated programs 533 may be filtered by example unit test results at filtering module 535, such that the filtering module 535 select programs that pass example tests as a set $\mathcal{P}$ 541 and remaining programs that failed (including programs that cannot be compiled, cannot be executed, or are successfully compiled and executed but fail to generate a matching result with the example unit tests) as a set $\mathcal{F}$ 542.

The generated programs 533 may go through a program refining procedure 550 to generate the final programs 555. Specifically, although programs in pass set $\mathcal{P}$ 541 successfully pass example tests, it is not guaranteed that these programs will succeed against the final hidden unit tests 536. Hidden tests are often more comprehensive and may contain corner cases that challenge these programs. Therefore, another round of generation may be conducted to further refine the programs in the pass set 541.

In one implementation, sub-sequences from these program samples from pass set $\mathcal{P}$ 541 may be used as prompts (or "seed" sequences) to the actor LM 130. A separate critic model ($\phi_{test}$) may be employed to guide the choice of subsequences from these filtered samples from pass set $\mathcal{P}$ 541. This critic model is trained with a similar objective as training objective 409 described in relation to FIG. 4, but in a binary classification setup with {FailedTest;PassedTest} labels. Let $W^{pass} = \{w_1, \ldots, w_T\}$ denote a generated sample that passes the example unit tests, and the critic model assigns a value to each token of the generated sample:

$$\hat{q}_{\phi_{test}}(w_t) = p_{\phi_{test}}(\hat{u} = \text{PassedTest} | w_{1:t}, D). \quad (10)$$

corresponding to the critic's predicted probability of the sub-sequence till t passing the unit tests. The sequence at position $t_{max}$ corresponding to the highest critic assigned value and the sub-sequence 543 to the left of the position $t_{max}$ is used as the seed 545 for the next stage. If this seed sequence till $t_{max}$ contains a token with $p_{\phi_{test}}$(FailedTest)>$p_{\phi_{test}}$(PassedTest), the subsequence is further chopped at this token by removing tokens on the right. This is done to pick prompts that are likely to generate successful programs in the next round.

Therefore, the subsequences 543 are used as seeds 545 to initialize and condition the (actor) LM 130 to resample new tokens till the <endoftext> token. In this round, each seed sequence can be stacked N/|P| times for upsampling. This results in the same number of output programs N as in the first round of generation. Finally, the generated N refined programs 555 may be evaluated against the hidden unit tests 536.

In some situations, generating programs to solve a problem, especially a competition-level programming problem, involves a huge search space of possible programs. Very often, complete failure may be observed where all programs fail against example tests, i.e. $|\mathcal{F}|=N$. Therefore, for these cases, an additional generation step 560 may be employed to first repair programs before refining them.

In one embodiment, the same critic model ($\phi_{test}$) that is also employed in program refining procedure 550 is used, to sample top candidates from the fail set $\mathcal{F}$ 542 at module 561. Let Wfail denote a generated sample from the fail set 542 that fails the example unit tests 112, and then the critic model to assign a value to this sample:

$$\hat{q}_{\phi_{test}}(W^{fail}) = p_{\phi_{test}}(\hat{u} = \text{PassedTest} | W^{fail}, D) \quad (11)$$

corresponding to the critic's predicted probability of the program passing the unit tests. The top M failed programs 565 are selected with the highest probabilities and passed to a program repair model w 566.

In one embodiment, this program repair model 566 is designed as a sequence-to-sequence generation model. The input sequence is the concatenation of the problem description D 505 and buggy program Wfail. Additional signals received from the unit test results 112, include the type of test outcomes, e.g., one of CompileError, RuntimeError, FailedTest, PassedTest, and error subtypes (e.g. syntax errors, out-of-index errors, and/or the like) may also be included in the input sequence. The error types are extracted from error traces returned by the compiler.

To train the program repair model 566, the synthetic samples 133 that are originally used in the RL training to train the actor-critic network 150 are used as the buggy programs $W_{fail} = W^s$. The ground-truth program W 106 can be used as the expected correct program. The training objective of the program repair model is to minimize the cross-entropy loss:

$$\mathcal{L}_{ce}^{repair}(\bar{\omega}) = -\Sigma_t \log p_{\bar{\omega}}(W|D, W^{fail}, u, c) = -\Sigma_t \log[p_{\bar{\omega}}(w_t|D, W^{fail}, u, c)] \quad (13)$$

where u is one of {CompileError; RuntimeError; FailedTest; PassedTest} and c is the error subtype. During inference time, each selected failed sequence can be stacked N/M times for upsampling. This results in the same number of output programs N as in the first round of generation. Finally, these N repaired programs generated by the program repairing model 561 may be passed to module 543 to apply the code refining procedure 550 as described above.

In one implementation, programs 533 may eb generated in mini-batches to improve efficiency during inference and employ nucleus sampling with a batch size of N=200. Note that during program refining, while additional computation costs may be incurred to re-sample using the seed sequences 545, only partial programs need to be generated in the re-generation stage. In this way, the program refining stage may be less expensive than conventional program synthesis.

Computer Environment

Figure 6:
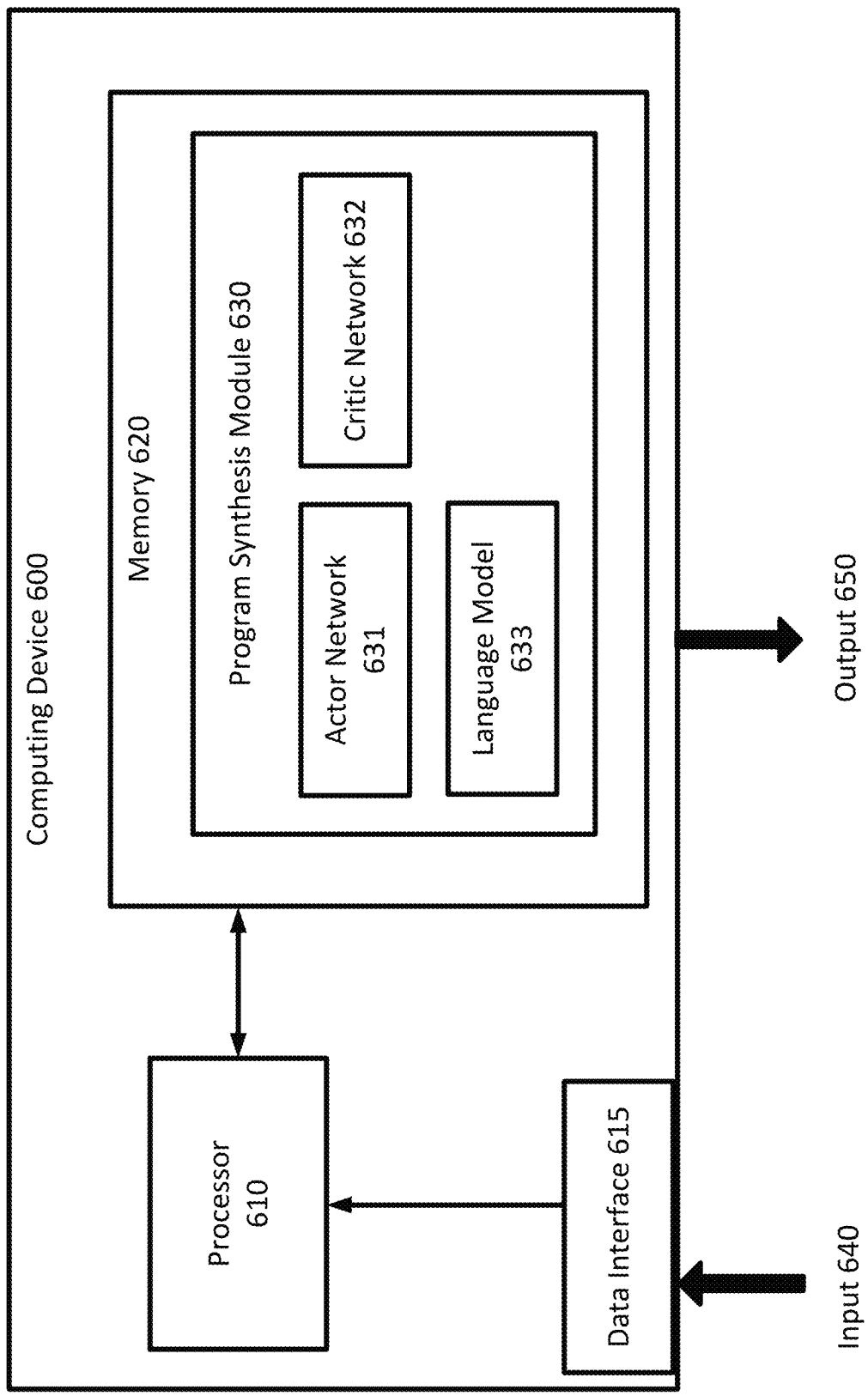
FIG. 6 is a simplified diagram of a computing device for implementing the reinforcement learning based program synthesis framework shown in FIGS. 1-5, according to some embodiments.

FIG. 6 is a simplified diagram of a computing device 600 for implementing the reinforcement learning based program synthesis framework shown in FIGS. 1-5, according to some embodiments. As shown in FIG. 6, computing device 600 includes a processor 610 coupled to memory 620. Operation of computing device 600 is controlled by processor 610. And although computing device 600 is shown with only one processor 610, it is understood that processor 610 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 600. Computing device 600 may be implemented as a stand-alone subsystem, as a board added to a computing device, and/or as a virtual machine.

Memory 620 may be used to store software executed by computing device 600 and/or one or more data structures used during operation of computing device 600. Memory 620 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip, or cartridge, and/or any other medium from which a processor or computer is adapted to read.

Processor 610 and/or memory 620 may be arranged in any suitable physical arrangement. In some embodiments, processor 610 and/or memory 620 may be implemented on a same board, in a same package (e.g., system-in-package), on a same chip (e.g., system-on-chip), and/or the like. In some embodiments, processor 610 and/or memory 620 may include distributed, virtualized, and/or containerized computing resources. Consistent with such embodiments, processor 610 and/or memory 620 may be located in one or more data centers and/or cloud computing facilities.

In some examples, memory 620 may include non-transitory, tangible, machine readable media that includes executable code that when run by one or more processors (e.g., processor 610) may cause the one or more processors to perform the methods described in further detail herein. For example, as shown, memory 620 includes instructions for a program synthesis module 630 that may be used to implement and/or emulate the systems and models, and/or to implement any of the methods described further herein. A program synthesis module 630 may receive input 640 that includes a natural language problem specification via the data interface 615 and generate a code program as output 650.

In some embodiments, the program synthesis model 630 includes an actor network module 631 (similar to 130 in FIG. 1), a critic network module 632 (similar to 140 in FIG. 1) and a language model 633 (similar to 110 or 120 in FIG.

1). Details of the program synthesis module 630 and its submodule 631-633 and their interactions may be discussed in relation to FIGS. 1-5.

In one embodiment, the program synthesis module 630 and its submodule 631-633 may be implemented by hardware, software and/or a combination thereof.

Some examples of computing devices, such as computing device 400 may include non-transitory, tangible, machine readable media that include executable code that when run by one or more processors (e.g., processor 410) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 7:
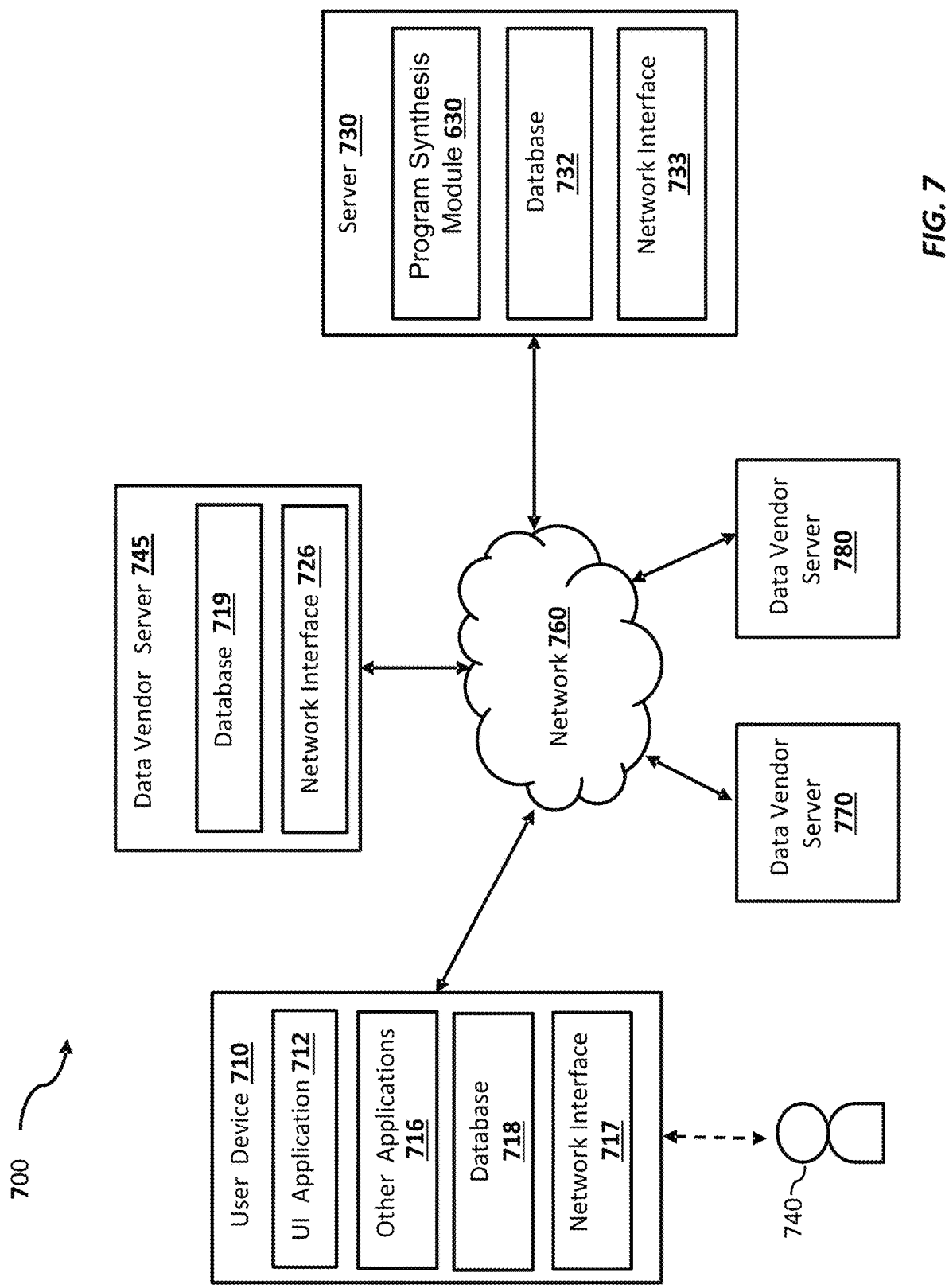
FIG. 7 is a simplified block diagram of a networked system suitable for implementing the program synthesis framework described in FIGS. 1-5 and other embodiments described herein.

FIG. 7 is a simplified block diagram of a networked system suitable for implementing the program synthesis framework described in FIGS. 1-5 and other embodiments described herein. In one embodiment, block diagram 700 shows a system including the user device 710 which may be operated by user 740, data vendor servers 745, 770 and 780, server 730, and other forms of devices, servers, and/or software components that operate to perform various methodologies in accordance with the described embodiments. Exemplary devices and servers may include device, stand-alone, and enterprise-class servers which may be similar to the computing device 100 described in FIG. 1, operating an OS such as a MICROSOFT® OS, a UNIX® OS, a LINUX® OS, or other suitable device and/or server-based OS. It can be appreciated that the devices and/or servers illustrated in FIG. 7 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 710, data vendor servers 745, 770 and 780, and the server 730 may communicate with each other over a network 760. User device 710 may be utilized by a user 740 (e.g., a driver, a system admin, etc.) to access the various features available for user device 710, which may include processes and/or applications associated with the server 730 to receive an output data anomaly report.

User device 710, data vendor server 745, and the server 730 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 700, and/or accessible over network 760.

User device 710 may be implemented as a communication device that may utilize appropriate hardware and software configured for wired and/or wireless communication with data vendor server 745 and/or the server 730. For example, in one embodiment, user device 710 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 710 of FIG. 7 contains a user interface (UI) application 712, and/or other applications 716, which may correspond to executable processes, procedures, and/or applications with associated hardware. For example, the user device 710 may receive a message indicating the generated program from the server 730 and display the message via the UI application 712. In other embodiments, user device 710 may include additional or different modules having specialized hardware and/or software as required.

In various embodiments, user device 710 includes other applications 716 as may be desired in particular embodiments to provide features to user device 710. For example, other applications 716 may include security applications for implementing client-side security features, programmatic client applications for interfacing with appropriate application programming interfaces (APIs) over network 760, or other types of applications. Other applications 716 may also include communication applications, such as email, texting, voice, social networking, and IM applications that allow a user to send and receive emails, calls, texts, and other notifications through network 760. For example, the other application 716 may be an email or instant messaging application that receives a prediction result message from the server 730. Other applications 716 may include device interfaces and other display modules that may receive input and/or output information. For example, other applications 716 may contain software programs for asset management, executable by a processor, including a graphical user interface (GUI) configured to provide an interface to the user 740 to view generated program.

User device 710 may further include database 718 stored in a transitory and/or non-transitory memory of user device 710, which may store various applications and data and be utilized during execution of various modules of user device 710. Database 718 may store user profile relating to the user 740, predictions previously viewed or saved by the user 740, historical data received from the server 730, and/or the like. In some embodiments, database 718 may be local to user device 710. However, in other embodiments, database 718 may be external to user device 710 and accessible by user device 710, including cloud storage systems and/or databases that are accessible over network 760.

User device 710 includes at least one network interface component 719 adapted to communicate with data vendor server 745 and/or the server 730. In various embodiments, network interface component 719 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 745 may correspond to a server that hosts one or more of the databases 703a-n (or collectively referred to as 703) to provide training datasets including public code data to the server 730. The database 703 may be implemented by one or more relational database, distributed databases, cloud databases, and/or the like.

The data vendor server 745 includes at least one network interface component 726 adapted to communicate with user device 710 and/or the server 730. In various embodiments, network interface component 726 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 745 may send asset information from the database 703, via the network interface 726, to the server 730.

The server 730 may be housed with the program synthesis module 630 and its submodules described in FIG. 1. In some implementations, module 630 may receive training code data from database 719 at the data vendor server 745 via the network 760 to generate programs. The generated programs may also be sent to the user device 710 for review by the user 740 via the network 760.

The database 732 may be stored in a transitory and/or non-transitory memory of the server 730. In one implementation, the database 732 may store data obtained from the data vendor server 745. In one implementation, the database 732 may store parameters of the program synthesis model 630. In one implementation, the database 732 may store previously generated programs and problem descriptions, and the corresponding input feature vectors.

In some embodiments, database 732 may be local to the server 730. However, in other embodiments, database 732 may be external to the server 730 and accessible by the server 730, including cloud storage systems and/or databases that are accessible over network 760.

The server 730 includes at least one network interface component 733 adapted to communicate with user device 710 and/or data vendor servers 745, 770 or 780 over network 760. In various embodiments, network interface component 733 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 760 may be implemented as a single network or a combination of multiple networks. For example, in various embodiments, network 760 may include the Internet or one or more intranets, landline networks, wireless networks, and/or other appropriate types of networks. Thus, network 760 may correspond to small scale communication networks, such as a private or local area network, or a larger scale network, such as a wide area network or the Internet, accessible by the various components of system 700.

Example Workflows

Figure 8:
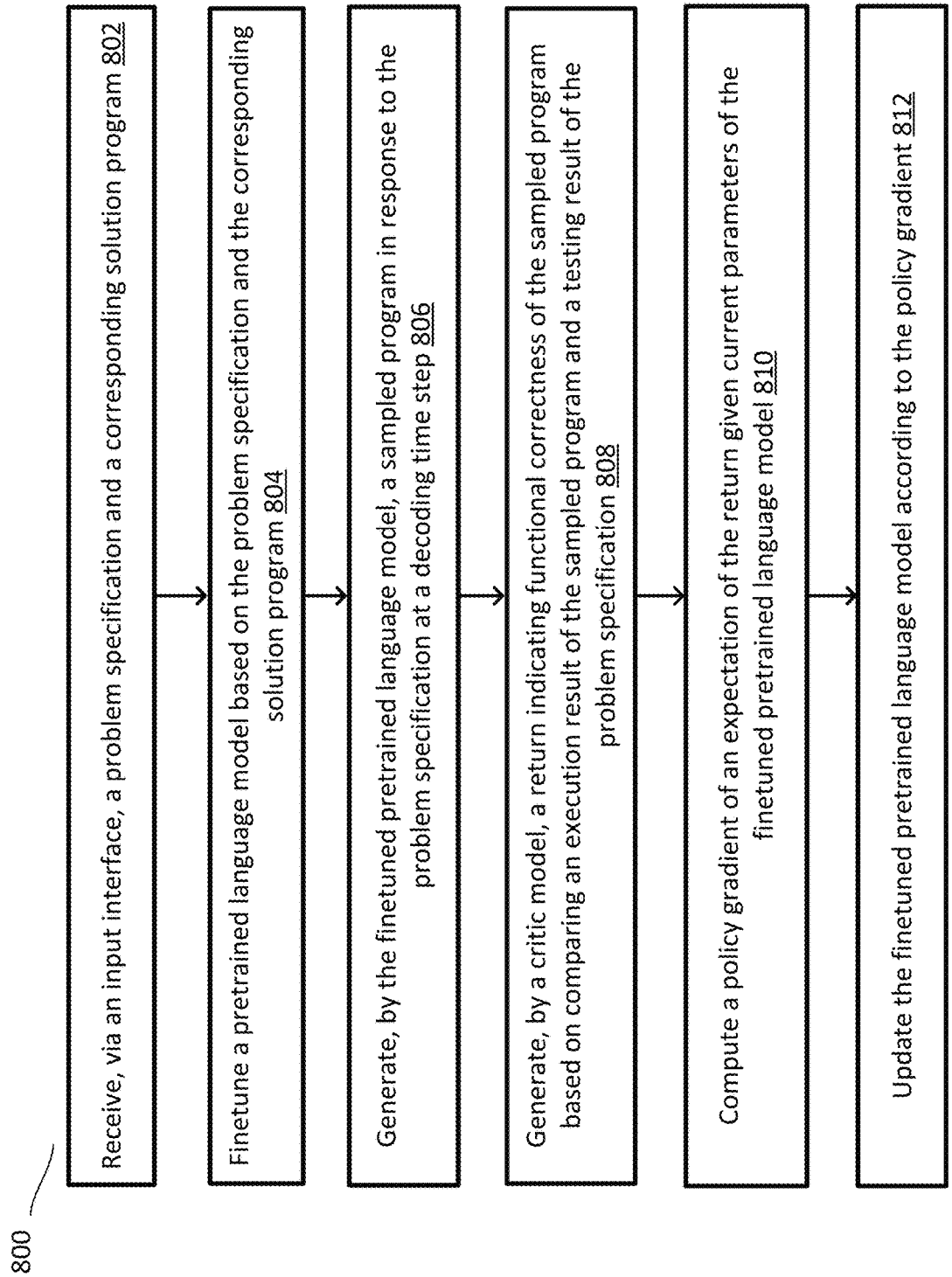
FIG. 8 is an example logic flow diagram illustrating a method of reinforcement learning based training for program synthesis based on the actor-critic framework shown in FIG. 1, according to some embodiments described herein.

FIG. 8 is an example logic flow diagram illustrating a method of reinforcement learning based training for program synthesis based on the actor-critic framework shown in FIG. 1, according to some embodiments described herein. One or more of the processes of method 800 may be implemented, at least in part, in the form of executable code stored on non-transitory, tangible, machine-readable media that when run by one or more processors may cause the one or more processors to perform one or more of the processes. In some embodiments, method 800 corresponds to the operation of the program synthesis module 630 (e.g., FIGS. 6-7).

At step 802, a problem specification (e.g., 105 in FIG. 1) and a corresponding solution program (e.g., 106 in FIG. 1) may be received, via an input interface (e.g., 615 in FIG. 6, 733 in FIG. 7).

At step 804, a pretrained language model (e.g., 120 in FIG. 1) may be finetuned based on the problem specification and the corresponding solution program.

At step 806, the finetuned pretrained language model (e.g., 130 in FIG. 1) may generate a sampled program (e.g., 133 in FIG. 1) in response to the problem specification (e.g., 105 in FIG. 1) at a decoding time step. For example, in one implementation, a predicted token $w_t$ for the sampled program may be generated governed by the current parameters of the finetuned pretrained language model (e.g., 130 in FIG. 1) at the decoding time step t. Hidden state representations of the finetuned pretrained language model may be updated accordingly, and a next predicted token $w_{t+1}$ for the sampled program may be generated using the updated hidden state representations of the finetuned pretrained language model at a next decoding time step t+1.

At step 808, a critic model (e.g., 140 in FIG. 1) may generate a return indicating functional correctness of the sampled program based on comparing an execution result of the sampled program and a testing result of the problem specification. For example, in one implementation, the return is generated when an ending token is generated for the sampled program. The sampled program (e.g., 133 in FIG. 1) and a test (e.g., 112 in FIG. 1) may be passed to a complier, and a first return value may be determined depending on whether the sampled program is successfully compiled and executed and whether the execution result matches with the testing result of the problem specification, e.g., according to Eq. (2).

At step 810, a policy gradient (e.g., gradient of 135 in FIG. 1) of an expectation of the return given current parameters of the finetuned pretrained language model may be computed. For example, in one implementation, the policy gradient is computed as an estimate based on the return and a gradient of a conditional probability of a predicted token conditioned on prior predicted tokens and the problem specification, e.g., according to Eq. (4).

In one implementation, the policy gradient may be computed using baseline comparison. For example, a baseline program generated by a base model in response to the problem specification may be input to the critic model (e.g., 140 in FIG. 1). A second return value may be determined depending on whether the baseline program is successfully compiled and executed and whether the execution result matches with the testing result of the problem specification. In this way, the policy gradient is computed based on a difference between the first return value and the second return value and a gradient of a conditional probability of a predicted token conditioned on prior predicted tokens and the problem specification, e.g., according to Eq. (5).

In another implementation, the policy gradient is computed based on a probability distribution of a predicted test outcome generated by the critic model and a gradient of a conditional probability of a predicted token conditioned on prior predicted tokens and the problem specification, e.g., according to Eq. (9).

At step 812, the finetuned pretrained language model (e.g., 130 in FIG. 1) may be updated according to the policy gradient.

In one implementation, the critic model (e.g., 140 in FIG. 1) is trained. the critic model may receive a training sequence of the problem specification (e.g., 105 in FIG. 1) and the sampled program (e.g., 133 in FIG. 1), and generate a predicted test outcome corresponding to the sampled program. The predicted test outcome is computed a softmax operation of max-pooled contextual hidden states of a decoder in the critic model, e.g., according to Eqs. (6)-(7). A cross-entropy loss by comparing the predicted test outcome and the execution result of the sampled program, e.g., according to Eq. (8), and the critic model may be updated based on the cross-entropy loss.

Figure 9:
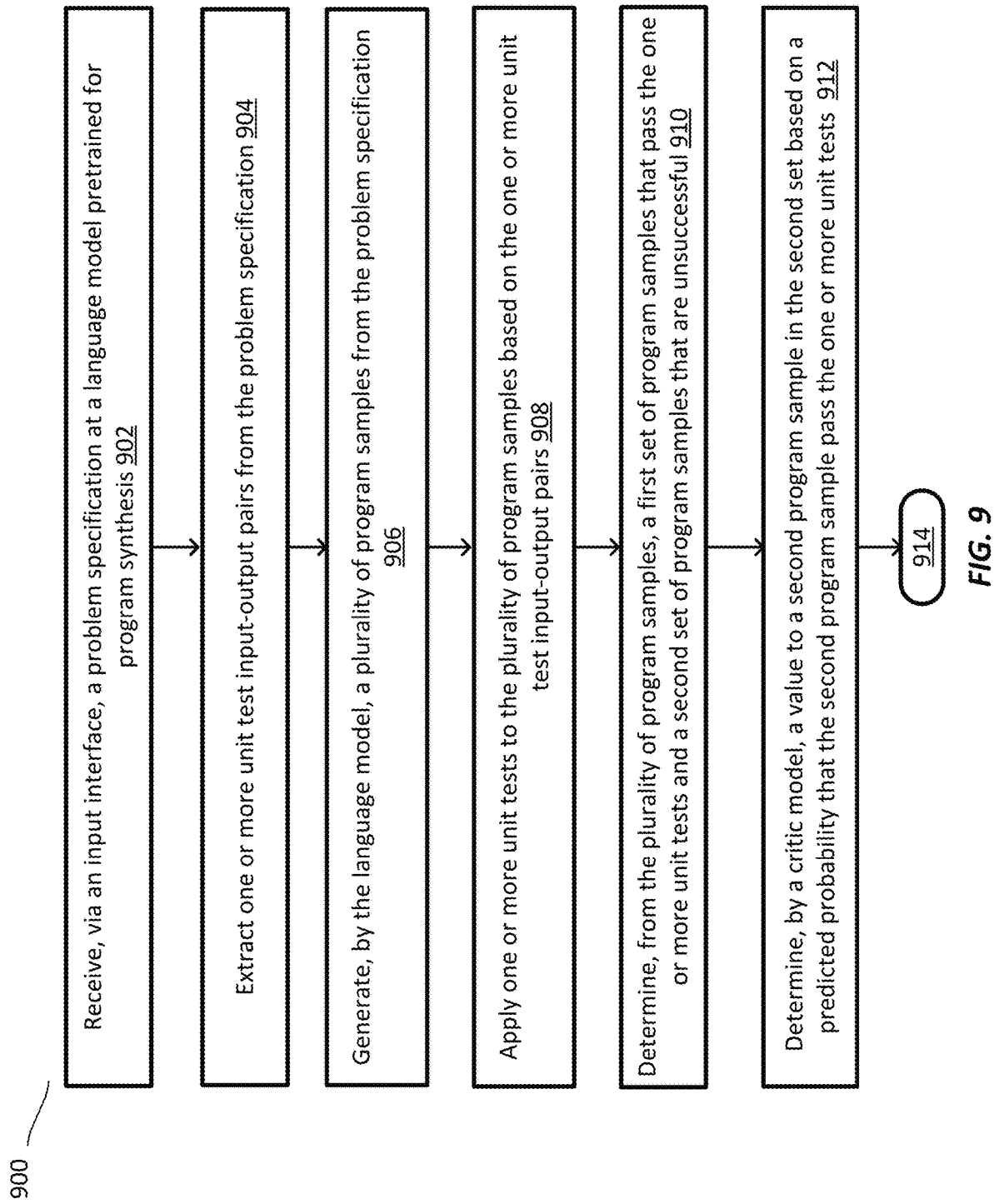
FIG. 9 is an example logic flow diagram illustrating a method of program synthesis based on the LM shown in FIG. 5, according to some embodiments described herein.

FIG. 9 is an example logic flow diagram illustrating a method of program synthesis based on the LM shown in FIG. 5, according to some embodiments described herein. One or more of the processes of method 900 may be implemented, at least in part, in the form of executable code stored on non-transitory, tangible, machine-readable media that when run by one or more processors may cause the one or more processors to perform one or more of the processes. In some embodiments, method 800 corresponds to the operation of the program synthesis module 630 (e.g., FIGS. 6-7).

At step 902, a problem specification (e.g., 505 in FIG. 5) may be received, via an input interface (e.g., 615 in FIG. 6, 733 in FIG. 7), at a language model (e.g., 130 in FIG. 5) pretrained for program synthesis.

At step 904, one or more unit test input-output pairs (e.g., 112 in FIG. 2) may be extracted from the problem specification (e.g., 105 in FIG. 2).

At step 906, the language model may generate a plurality of program samples (e.g., 533 in FIG. 5) from the problem specification.

At step 908, one or more unit tests (e.g., 112 in FIG. 5) may be applied to the plurality of program samples (e.g., 533 in FIG. 5) based on the one or more unit test input-output pairs.

At step 910, a first set of program samples (e.g., 541 in FIG. 5) that pass the one or more unit tests and a second set of program samples (e.g., 542 in FIG. 5) that are unsuccessful may be determined, from the plurality of program samples. For example, program samples in the second set comprise at least one of compile error, runtime error and failure to pass at least one of the unit tests.

At step 912, a critic model may determine a value to a second program sample in the second set based on a predicted probability that the second program sample pass the one or more unit tests, e.g., according to Eq. (11).

At step 914, a subset of program samples (e.g., 565 in FIG. 5) may be selected with the highest values from the second set. An input sequence (e.g., 566) is formed by concatenating the problem specification, a selected program sample and error information corresponding to the selected program sample. For example, the error information comprises any of: a unit test outcome corresponding to the selected program sample, and an error subtype during compiling or runtime of the selected program sample.

At step 916, a program repair model may be used to generate a repaired program sample based on the input sequence. For example, the program repair model is trained by a training objective comparing program samples that fail the unit tests and a ground-truth program corresponding to the problem specification, conditioned on a unit test outcome and/or an error subtype corresponding to the program samples.

At step 918, one or more sub-sequences (e.g., 543 in FIG. 5) may be selected, via critic scoring, from the first set of program samples. Each sub-sequence is a truncated version of a program sample. For example, in one implementation, a critic model may determine a value to each token of a first program sample in the first set based on a predicted probability that a subsequence up to the respective token pass the one or more unit tests, e.g., according to Eq. (10). A particular token of the first program sample having a highest value may be identified, and a sub-sequence of the first program sample up to the particular token may be selected as a sub-sequence. When the selected sub-sequence contains a particular token up to which a corresponding sub-sequence has a higher probability to fail than to pass the one or more unit tests, the selected sub-sequence is further chopped at the particular token.

At step 920, the language model may generate remaining tokens conditioned on the one or more sub-sequences, e.g., using the sub-sequences as "seeds" (e.g., 545 in FIG. 5).

At step 922, the generated remaining tokens from step 920 may be combined with the one or more sub-sequences to generate one or more refined program samples.

Example Data Experiments

In example data experiments of the proposed RL-based program synthesis framework shown in FIGS. 1-5 and work flows in FIGS. 8-9, a CodeT5-large model (770M) is pretrained from scratch following T5-large's architecture. Specifically, code-specific tokenizer are used from the CodeT5 work, and 6 programming languages (PLs) are used in CodeSearchNet (described in Husain et al., Codesearchnet challenge: Evaluating the state of semantic code search, Computing Research Repository (CoRR), abs/1909.09436, 2019) (CSN) instead of 8 PLs in CodeT5 as C/C #datasets are not publicly available. Only the pretraining task of masked span prediction (MSP) are applied and hence, the model does not have to parse programs into abstract syntax trees (ASTs) to obtain the identifier information.

The last preprocessing step was required in other original pretraining tasks like masked identifier prediction in the original CodeT5 work. To further speed up training, data samples are concatenated to batch size 512 for pretraining with MSP and the resulting number of tokens is 1.1B. To validate the benefit of using this new pretrained CodeT5 as the foundation model (e.g., 130 in FIG. 1), this model is evaluated on CodeXGLUE.

Example data experiments are run on a kubernetes with 16 A100-40G GPUs on Google Cloud Platform and the total pretraining duration is around 21 days. In the first pretraining stage with MSP, a corruption rate of 15%, a peak learning rate (LR) of 2e-4, and a batch size of 2048 are adopted. CSN is pretrained for 150 epochs (10 days) and then on GCPY for 10 epochs (5 days). For the second stage pretraining with NTP, a peak LR of 1e-4 and a batch size of 256, and pretrain for 10 epochs (6 days) are adopted. The maximum length is set to 768 and 600 for source and target sequences respectively for this objective. For all experiments, an AdamW optimizer with a 0:05 weight decay and a linear decay LR scheduler with a warmup step of 1000 is adopted.

Following (Hendrycks et al., Measuring coding challenge competence with apps, in proceedings of NeurIPS, 2021; Chen et al., Evaluating large language models trained on code, arXiv preprint, arXiv:2107.03374, 2021) the models are evaluated using the pass@k metric, which is the percentage of problems solved by using k generated programs per problem. Following (Li et al., Competition-level code generation with alphacode, arXiv preprint, arXiv: 2203.07814, 2022), n@k metric is used, which only considers a subset of n candidates from k generated programs per problem. The subset of n candidates are typically selected by a filtering method by passing generated programs through example tests given as part of the problem description.

Example benchmarks for comparison include APPS program synthesis benchmark (see Hendrycks et al.), as it has large coding problems of varying difficulties collected from multiple coding websites. APPS consists of 10,000 coding problems with a 50-50 train-test split. Each problem is accompanied by 23.2 correct Python programs and 21.2 unit tests on average. The average length per problem is 293.2 words and the average length per program is 18.0 lines. The dataset is categorized into three levels of difficulty: Introductory (3639, train/test=2639/1000), Interview (5000, train/test=2000/3000), and Competition (1361, train/test=361/1000). Each sample includes 20 unit tests on average to validate the functional correctness of programs. The same preprocessing step in Hendrycks et al. are used to formulate the input sequences from problem descriptions.

On APPS, the pretrained CodeT5 is finetuned the RL-based framework described in FIG. 1. To warm-start CodeT5 models with Lce, a batch size of 64 and warmup LR from 0 to 2e-5 are used for the first 500 steps and polynomially (power=0:5) decay to 1e-5 until the end of 10 epochs, which takes around 30 hours on one A100 GPU. The maximum source and target sequence length is set to 600 and 512 respectively.

Additional benchmarks include MBPP Benchmark, which is a smaller and simpler Python program synthesis dataset (described in Austin et al., Program synthesis with large language models. arXiv preprint arXiv:2108.07732, 2021) (Mostly Basic Programming Problems) for evaluation. The dataset contains 974 instances with 374/90/500 instances for training/validation/testing respectively and 10 reserved for few-shot learning. The problems are typically short, usually one sentence of natural language descriptions each. Each problem is accompanied by 1 correct solution (6.8 lines of code on average) and 3 unit tests in the form of assert statements for validating the functional correctness. Unlike APPS, unit tests in MBPP are not hidden and are explicitly incorporated into the source sequences for program synthesis models. This might encourage models to be overfitting to these assert statements via hard-coding an if-expression very occasionally. However, for a fair comparison with the baselines, the source sequences are constructed in the same way as prior work. Specifically, the same prompt format as in Austin et al., are used to prepare the input sequence as: problem descriptions+"Your code should satisfy these tests:"+3 assert statements.

On MBPP, experiments with in both zero-shot (Section 4.5) and full finetuning setup are done. To finetune CodeT5, due to the small training set of MBPP, the models are finetuned for 60 epochs with a constant LR of 2e-5 and a batch size of 32, which takes less than 30 mins on one A100. The maximum source and target length are set to 382 and 306 respectively.

Example baselines include GPT2 (Radford et al., Language models are unsupervised multitask learners, OpenAI blog, 1(8):9, 2019), GPT-Neo (Black et al., GPT-NEO: Large scale autoregressive language modeling with mesh-tensorflow, doi.org, 2021), and GPT3 (Brown et al., Language models are few-shot learners. Advances in neural information processing systems, 33:1877-1901, 2020) to compare with the RL-based framework described herein (referred to as "CodeRL"). The results are also compared with Codex (see Chen et al.) and AlphaCode (see Li et al.). Note that by default, results of pretrained LMs (except for Codex and GPT3) are from models finetuned on APPS using the standard loss Lce only. As CodeRL is model-agnostic, it can be also integrated with GPT variants such as GPT-J and GPT-Neo.

FIG. 10(a) shows that the CodeRL with the CodeT5 model can achieve significant performance gains, outperforming many pretrained LMs of much larger sizes. Specifically, CodeRL achieved new SOTA results of 2:69% pass@1, 6:81% pass@5, and 20:98% pass@1000. FIG. 10(b) shows that when evaluating on a subset of filtered code samples, CodeRL+CodeT5 can achieve SOTA results of 8:48% 1@k and 12:62% 5@k.

Secondly, it is observed the benefits of upsampling generation when increasing the number of generation samples k from 1 to 1000. Note that while CodeRL incurs additional computation cost during inference with CS, CodeRL only requires much lower k to achieve comparable performance with other models.

Specifically, with k=1000 only, CodeRL performance is as good as AlphaCode with much a larger generation budget of k=50000. Finally, FIG. 10(b) also shows that for challenging programming tasks in interview and competition levels, finetuning can significantly improve model performance. Specifically, Codex, which was not finetuned on APPS and tested in a few-shot setting, can achieve good n@1000 results, but the model fails dramatically at synthesis tasks in interview and competition levels. This observation indicates a significant gap between the pretraining stage and downstream synthesis tasks.

FIG. 11 shows the results of CodeT5-770M trained by different approaches to estimate returns of code samples. Overall, the CodeRL objective with relative token-level return estimates by the critic model (Model D) can achieve the best performance on pass@1 and pass@5. Secondly, we note that using absolute returns without a baseline (Model B) could lead to the most performance drop, as this approach heavily penalizes all incorrect samples (even though they might still be better than a naive baseline). Hence, considering relative return estimates that can effectively exploit imperfect codes can lead to better synthesis systems. Thirdly, without a critic model, simply assigning identical rewards to all tokens in a code sample (Model A) is disadvantageous as these return estimates are too restrictive to be used as feedback signals for RL training. For instance, a program is considered incorrect only because of an additional blank space character, which can result in an Indentation Error in a Python program. Simply assigning an identical reward to all tokens in this program will heavily penalize correct parts of the program sequence. Finally, we experimented with a distance-based critic which assumes that token values $\hat{q}(w_t^s)$ decay linearly from t=1 to t=T (Model C). The lower performance suggests the benefit of training a critic network to compute the returns rather than relying on rule-based approaches.

FIG. 12 shows the results with different combinations of Lce and Lrl. Since CodeRL is model-agnostic, experiments to both CodeT5 and GPT-Neo are performed. Note that in these experiments, Lce and Lrl are applied on models that are already warm-started/finetuned with Lce for up to 10 epochs. Firstly, when with using only Lrl, the problem of vanishing gradients during finetuning, which was observed. Therefore, the final models actually deteriorate and lead to performance drops. Secondly, by using only Lce for further finetuning, despite improvement in losses during training time, the model performance indeed degrades during test time. These models are thus expected to be overfitting to the training data, as similarly observed in our analysis of pretrained models in FIG. 16.

In addition, it is observed that a naive approach of Lce with synthetic samples Ws, all of which are treated as correct codes with r(Ws)=1, still leads to some performance improvement with GPT-Neo on pass@5. However, in all other cases, this training strategy does not work as well as considering a critic model to estimate returns of Ws by their test results. Finally, it is observed that using both Lce and Lrl results in a more consistent performance improvement overall on pass@1 and pass@5 for the GPT-Neo and CodeT5 models.

Figures 13, 14:
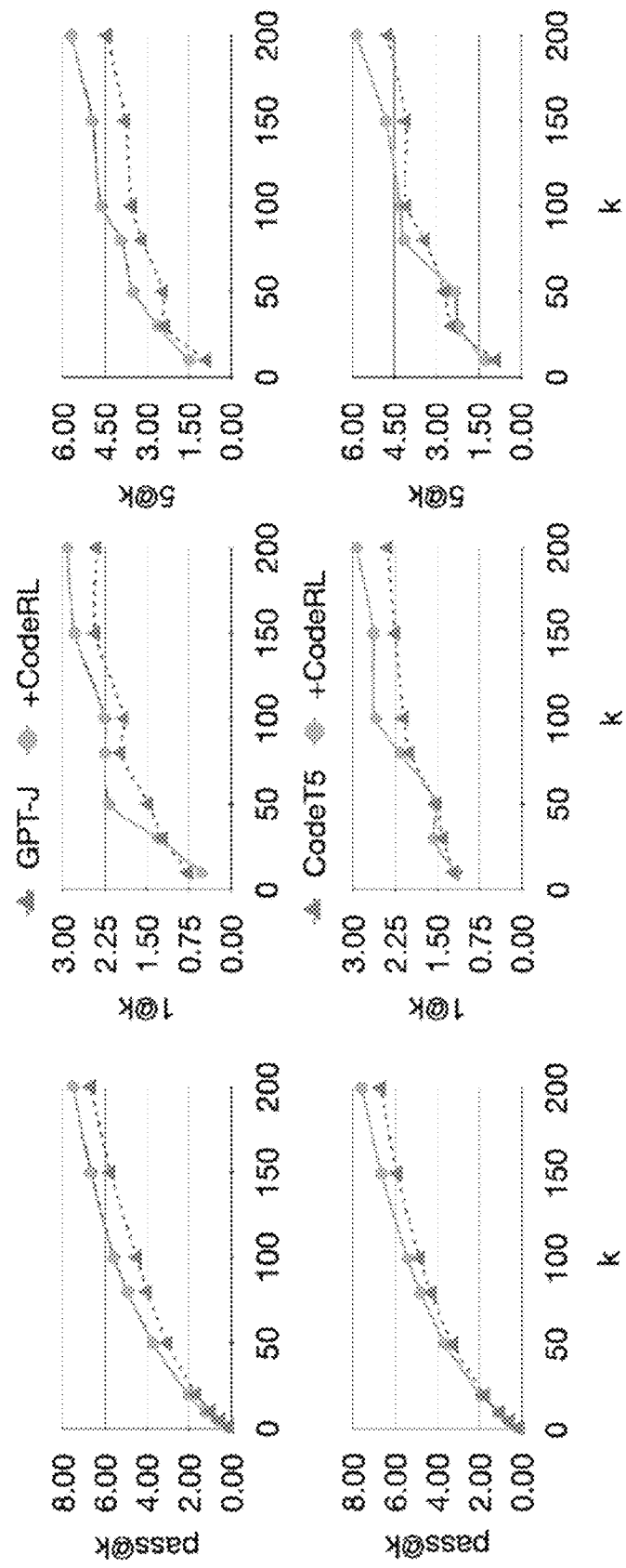

FIG. 13 shows the ablation results of critical sampling (CS) during inference, applied on CodeT5 models. Different combinations of program refining and repairing steps are tested. Overall, positive impacts of CS, combining both program refining and repairing, across all metrics, with particularly more significant gains on pass@1000, are observed. It is noted that just program refining alone can help to bring performance gains, but its impact is reduced on the 1@1000 metric. Note that n@k measures the solving rate among the subset P filtered from k samples. As program refining will technically increase the size of this subset, the n@k metric will consider an exponentially larger number of options of n samples than before. This will normalize n@k by a larger pool of n candidate set, resulting in less impact of program refining on model performance.

Secondly, when integrated program refining with program repairing (for problems where P=;), further performance gains in all metrics. Interestingly, when experimenting with different top-M selection schemes, we found the best overall performance with M=1 and performance starts to drop from M=2 to M=4 (except for pass@200 results). This observation indicates the benefit of using the critic model to focus on the best candidates for program repairing rather than choosing multiple program candidates. Moreover, with larger M, each program candidate will have a smaller number of batch size (i.e. N=M). This results in a lower chance for the program repair model to properly repair and generate correct programs.

In one embodiment, the data experiments investigate a subset of the APPS test split, which contains the test samples of the highest difficulty level (i.e. competition programming tasks). FIG. 14 shows the results of pass@k and n@k with k ranging from 1 to 200 and n=f1; 5 g, for CodeRL+CodeT5 and CodeT5 only. Since CodeRL is model-agnostic, we also integrate it with GPT-J and report the results. To focus on the impact of the RL optimization, during test time, models are compared with using only nucleus sampling and without the CS procedure.

FIG. 14 shows that the performance gains are quite consistent on both GPT-J and CodeT5. In particular, as k increases, the performance gain of CodeRL is more significant on both GPT-J and CodeT5 models. We attribute these gains to the CodeRL learning objective Lrl that encourages models to explore code solutions drawn from the model's sampling distribution. During test time with an increasing k sampling budget, models are allowed to generate diverse code solutions and the impact of Lrl becomes more significant.

Figure 15:
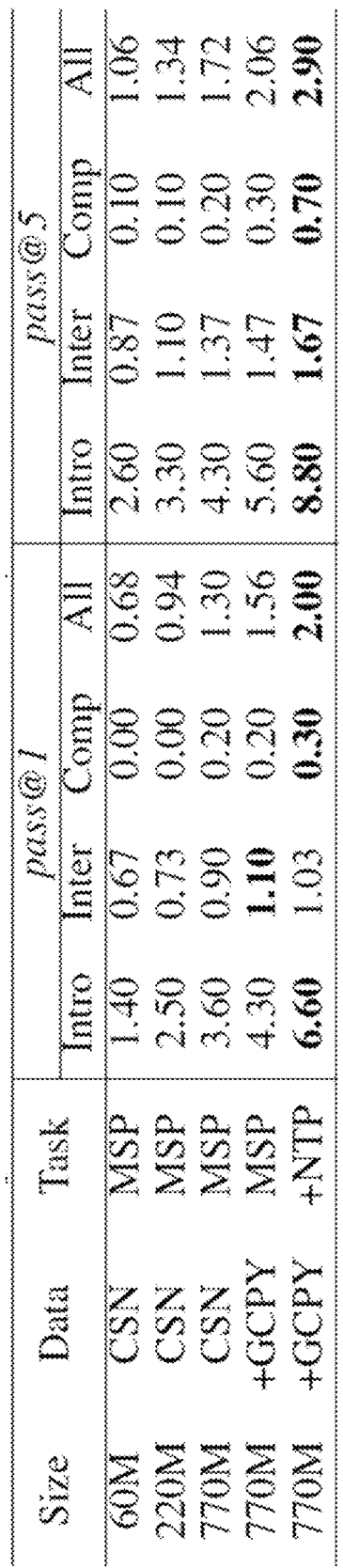

In one embodiment, the performance of synthesis systems is correlated with the quality of foundation models. FIG. 15 reports the results of CodeT5 with different configurations of model sizes, pretraining data, and pretraining objectives. For a fair comparison, all models are only finetuned/warm-started with Lce on APPS up to 12 epochs. It is observed that scaling up the number of model parameters (from 60M to 770M) can significantly improve model performance of downstream synthesis tasks. When the pretraining data is improved by adding the GCPY dataset (10× larger than the CSN dataset), good performance improvement may be observed, i.e. from 1:3 to 1:56 pass@1, and 1:72 to 2:06 pass@5. Finally, by combining the pretraining objective from Masked Span Prediction (MSP) and Next Token Prediction (NTP), the model is able to adapt better to the downstream synthesis.

Figure 16:
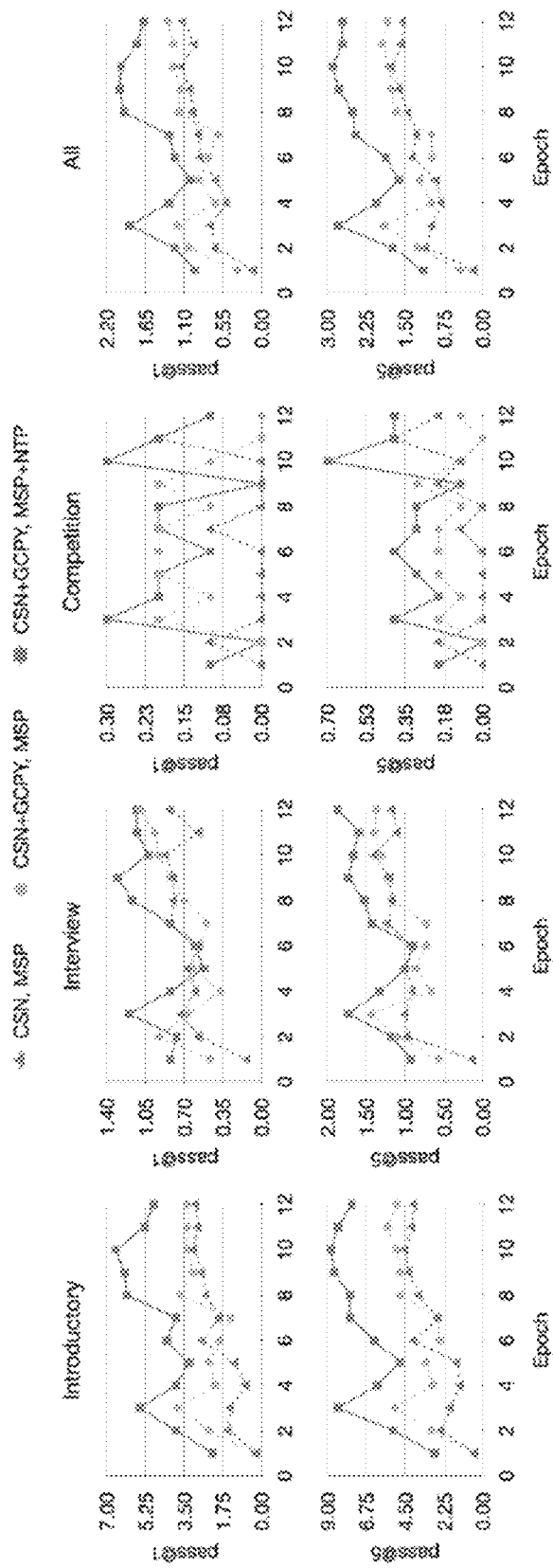

FIG. 16 shows the performance of CodeT5 model variants by finetuning epochs and by difficulty levels of programming tasks. Note that in these experiments, the data experiments only compare among CodeT5 model variants by pretraining strategies, and hence, only engage Lce in the finetuning stage on APPS. Consistent with our prior analysis, enhancing both pretraining data (with larger data of GCPY) and pretraining objectives (with NTP objective) improves model performance across training epochs in general. Moreover, as noted by the analysis of learning objectives, only using Lce often leads to overfitting performance, typically after epoch 10 in our case. Hence, to further finetune large-scale LMs, it is beneficial to adopt the RL objective Lrl to utilize synthetic training samples and avoid overfitting models.

Figures 17, 18:
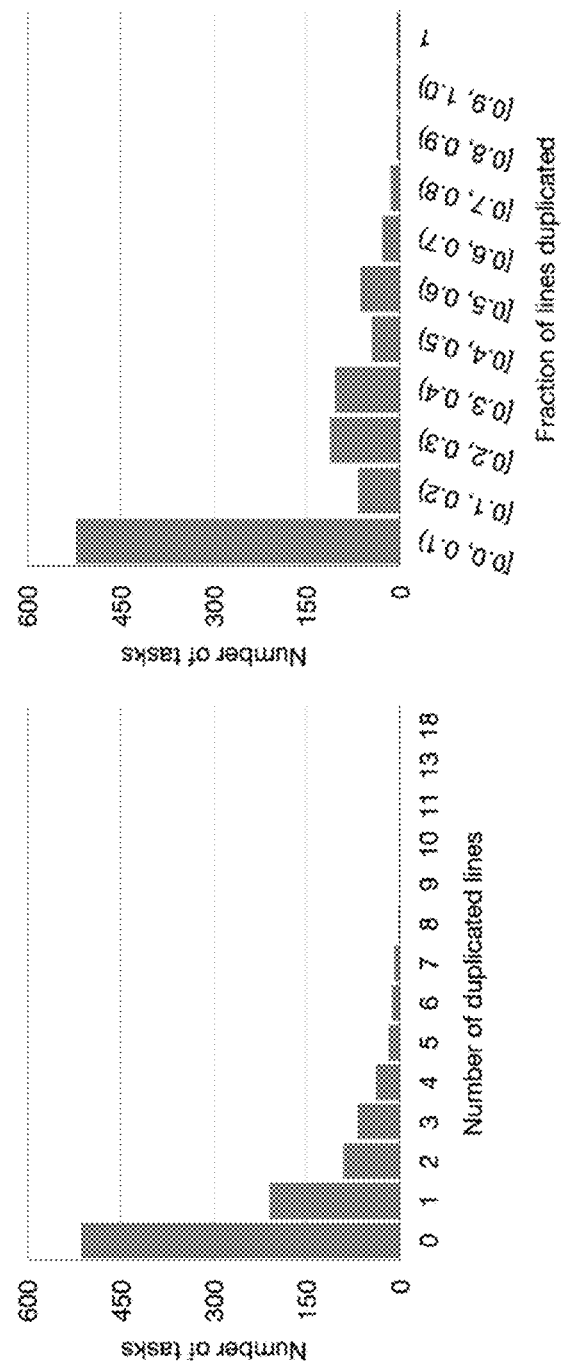

FIG. 17 reports the results of our CodeRL+CodeT5 on MBPP benchmark compared with finetuned GPT models of up to 137B size. The CodeRL+CodeT5 (ZS) was trained on APPS and then evaluated on MBPP in a zero-shot setting. It is observed that CodeRL with CodeT5 of a much smaller model size yields surprisingly good zero-shot performance, setting a new SOTA result of 63.0% pass@80 over GPT-137B's 61.4% pass@80. This validates the strong zero-shot transfer ability of CodeRL for unseen tasks.

A common concern about transfer learning is that the source (APPS) and target (MBPP) tasks might have overlap in their training data, which could result in the source model tending to memorize these substantially similar data when applied to the target task. To address this concern, it is analyzed how many lines of code appear in both the training set of APPS and programs of MBPP following Austin et al. For this analysis, code comments are discarded and the whitespaces are normalized for each line, and then exclude lines that appear more than twice anywhere in MBPP, as these are likely to be common Python keywords such as return and break.

FIG. 18 illustrates the number of absolute duplicated lines (Left) and relative fraction of duplicated lines (Right) in the MBPP programs. As can be seen, the overlap between APPS and MBPP seems to be minimal. Only 12.6% MBPP programs have more than half of their lines matched somewhere in the APPS training data. Besides, more than half (514 out of 974) of programs have a zero overlap and 90.9% have only no more than 3 lines overlapped with the APPS training set. If it is further required the lines to be consecutive, there are no more than 2 consecutive duplicated lines.

Figure 19:
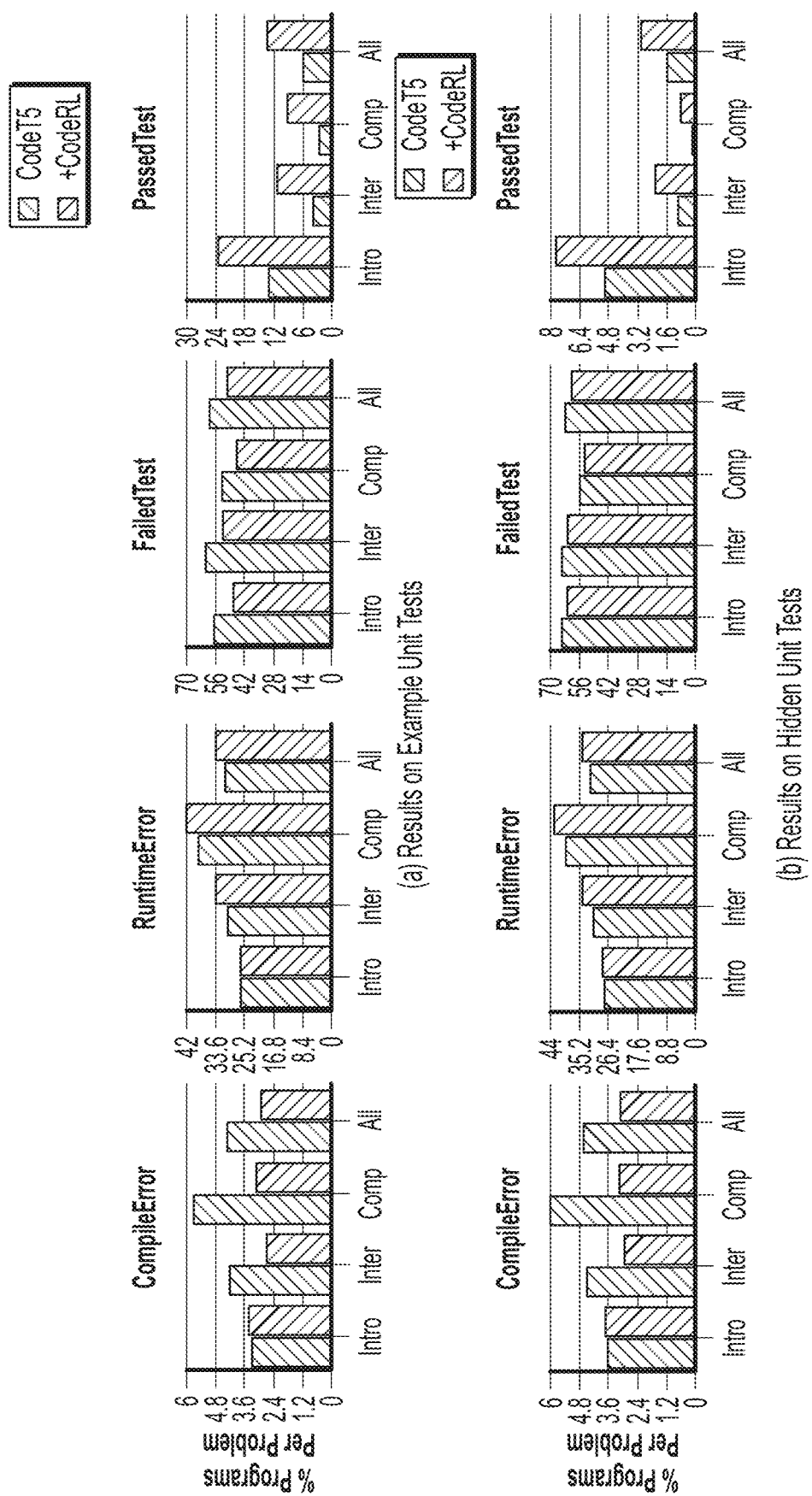

FIG. 19 demonstrates the average percentages of generated programs per problem, grouped by their test outcomes. Specifically, CodeT5 or CodeRL+CodeT5 are used to generate programs and randomly select 200 generated programs per test sample in the APPS test split. Programs are passed to either example unit tests or hidden unit tests and group the output programs by their test outcomes. The outcomes are categorized according to the definition in Eq. (2), including CompileError, RuntimeError, FailedTest, and PassedTest.

First, on both example unit tests and hidden unit tests, it is observed that integrating CodeRL can increase the likelihood that a program can pass the tests, and reduces the probability that it fails one or more unit tests. The probability to pass unit tests are improved more significantly in introductory-level programming problems.

Secondly, it is noted that the percentages of having compiling errors decrease in CodeRL-generated programs, with more effects on interview and competition-level problems. As compiling errors are less likely to occur with CodeRL programs, these programs are still suffered from runtime errors. This leads to a higher probability that a CodeRL program contains runtime errors.

It is noted that there are quite significant performance gaps by test outcomes between example unit tests (FIG. 19(a)) and hidden unit tests (FIG. 19(b)). This observation suggests that example tests are not as comprehensive as hidden tests and hence, limit the positive impacts of the CodeRL generation procedure due to false positives.

FIG. 20 shows an example of a programming problem from the APPS benchmark and corresponding programs generated by CodeT5 variants. Specifically, based on the same foundation pretrained CodeT5 (pretrained with GCPY data and NTP objective), the CodeT5 model that is finetuned by Lce only is compared with another model that follows CodeRL framework. In CodeRL+CodeT5, programs are shown before and after applying the CS procedure. It is observed that applying CodeRL can generate more appropriate programs and using the CS procedure further improves their functional correctness. For instance, in FIG. 20, CodeT5 model misunderstands the problem and focuses on finding the greatest common divisor between a and b only. Instead, the CodeRL model avoids this mistake and tackles the problem of finding the greatest common divisor between the factorials of a and b.

It is also found that CodeRL can improve the complexity of the generated programs, an important quality in complex programming problems. For instance, in the interview-level program in FIG. 20, without applying CS, the generated program is functionally correct but fails during execution due to a timeout error. This program simply computes separate factorials of both a and b, which will slow down the execution in scenarios with extremely large a or b. Applying the CS procedure can condition models on parts of the prior program and (re)generates new tokens to produce a more efficient program. In the example in FIG. 20, the factorials are computed on min(a,b) to improve the efficiency of the programs. Hence, the resulting final program is able to pass all hidden unit tests (including tests with extremely large values) without timeout errors.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of a reinforcement learning framework comprising a language model, an actor model and a critic model for code generation, the method comprising:
   receiving, via an input interface, a problem specification in a natural language including unit tests which contain example input-output testing pairs corresponding to the problem specification and a corresponding code segment that solves a problem described in the problem specification;
   finetuning the language model that has been pretrained on language tasks to generate code programs based on the problem specification and using the corresponding code segment as a ground truth;
   generating, by the finetuned pretrained language model acting as the actor model, one or more tokens representing a sampled code program in response to the problem specification at a decoding time step;
   compiling, by a processor, the sampled code program comprising the one or more tokens at a compiling environment and executing the sampled code program with a testing input from the unit tests to generate an execution result;
   generating, by the critic model, a return indicating functional correctness of the sampled code program based on comparing the execution result of the sampled code program and a testing result of the problem specification;
   computing a policy gradient of an expectation of the return given current parameters of the finetuned pretrained language model;
   updating the current parameters of the finetuned pretrained language model according to the policy gradient; and
   generating, by the finetuned pretrained language model having the updated current parameters, a repaired code program that repairs the sampled code program based on an input combining the problem specification, the sampled code program and the execution result of the sampled code program.

2. The method of claim 1, wherein the sampled code program is generated by:
   generating a predicted token for the sampled code program governed by the current parameters of the finetuned pretrained language model at the decoding time step; updating hidden state representations of the finetuned pretrained language model; and generating a next predicted token for the sampled code program using the updated hidden state representations of the finetuned pretrained language model at a next decoding time step.

3. The method of claim 2, wherein the return is generated when an ending token is generated for the sampled code program.

4. The method of claim 1, wherein the return is generated by: passing the sampled code program and a test to a complier; and determining a first return value depending on whether the sampled code program is successfully compiled and executed and whether the execution result matches with the testing result of the problem specification.

5. The method of claim 4, wherein the policy gradient is computed as an estimate based on the return and a gradient of a conditional probability of a predicted token conditioned on prior predicted tokens and the problem specification.

6. The method of claim 4, further comprising:
inputting, to the critic model, a baseline program generated by a base model in response to the problem specification; and
determining a second return value depending on whether the baseline program is successfully compiled and executed and whether the execution result matches with the testing result of the problem specification.

7. The method of claim 6, wherein the wherein the policy gradient is computed based on a difference between the first return value and the second return value and a gradient of a conditional probability of a predicted token conditioned on prior predicted tokens and the problem specification.

8. The method of claim 1, wherein the critic model is trained by: receiving, by the critic model, a training sequence of the problem specification and the sampled code program; generating, by the critic model, a predicted test outcome corresponding to the sampled code program; computing a cross-entropy loss by comparing the predicted test outcome and the execution result of the sampled code program; and updating the critic model based on the cross-entropy loss.

9. The method of claim 8, wherein the predicted test outcome is computed a softmax operation of max-pooled contextual hidden states of a decoder in the critic model.

10. The method of claim 9, wherein the policy gradient is computed based on a probability distribution of the predicted test outcome generated by the critic model and a gradient of a conditional probability of a predicted token conditioned on prior predicted tokens and the problem specification.

11. A system of a reinforcement learning framework comprising a language model, an actor model and a critic model for code generation, the system comprising:
an input interface that receives a problem specification in a natural language including unit tests which contain example input-output testing pairs corresponding to the problem specification and a corresponding code segment that solves a problem described in the problem specification;
a memory storing a plurality of processor-executable instructions;
a processor that reads and executes the plurality of processor-executable instructions to perform operations comprising:
finetuning the language model that has been pretrained on language tasks to generate code programs based on the problem specification and using the corresponding code segment as a ground truth;
generating, by the finetuned pretrained language model acting as the actor model, one or more tokens representing a sampled code program in response to the problem specification at a decoding time step;
compiling, by the processor, the sampled code program comprising the one or more tokens at a compiling environment and executing the sampled code program with a testing input from the unit tests to generate an execution result;
generating, by the critic model, a return indicating functional correctness of the sampled code program based on comparing the execution result of the sampled code program and a testing result of the problem specification;
computing a policy gradient of an expectation of the return given current parameters of the finetuned pretrained language model;
updating the current parameters of the finetuned pretrained language model according to the policy gradient; and
generating, by the finetuned pretrained language model having the updated current parameters, a repaired code program that repairs the sampled code program based on an input combining the problem specification, the sampled code program and the execution result of the sampled code program.

12. The system of claim 11, wherein the sampled code program is generated by: generating a predicted token for the sampled code program governed by the current parameters of the finetuned pretrained language model at the decoding time step; updating hidden state representations of the finetuned pretrained language model; and generating a next predicted token for the sampled code program using the updated hidden state representations of the finetuned pretrained language model at a next decoding time step.

13. The system of claim 12, wherein the return is generated when an ending token is generated for the sampled code program.

14. The system of claim 11, wherein the return is generated by: passing the sampled code program and a test to a complier; and determining a first return value depending on whether the sampled code program is successfully compiled and executed and whether the execution result matches with the testing result of the problem specification.

15. The system of claim 14, wherein the policy gradient is computed as an estimate based on the return and a gradient of a conditional probability of a predicted token conditioned on prior predicted tokens and the problem specification.

16. The system of claim 14, wherein the operations further comprise:
inputting, to the critic model, a baseline program generated by a base model in response to the problem specification; and
determining a second return value depending on whether the baseline program is successfully compiled and executed and whether the execution result matches with the testing result of the problem specification.

17. The system of claim 16, wherein the wherein the policy gradient is computed based on a difference between the first return value and the second return value and a gradient of a conditional probability of a predicted token conditioned on prior predicted tokens and the problem specification.

18. The system of claim 11, wherein the critic model is trained by: receiving, by the critic model, a training sequence of the problem specification and the sampled code program; generating, by the critic model, a predicted test outcome corresponding to the sampled code program; computing a cross-entropy loss by comparing the predicted test outcome and the execution result of the sampled code program; and updating the critic model based on the cross-entropy loss.

19. The system of claim 18, wherein the predicted test outcome is computed a softmax operation of max-pooled contextual hidden states of a decoder in the critic model, and wherein the policy gradient is computed based on a probability distribution of the predicted test outcome generated by the critic model and a gradient of a conditional probability of a predicted token conditioned on prior predicted tokens and the problem specification.

20. A non-transitory machine-readable medium storing a plurality of processor-executable instructions for a reinforcement learning framework comprising a language model, an actor model and a critic model for code generation, the processor-executable instructions being executed by one or more processors to perform operations comprising:

receiving, via an input interface, a problem specification in a natural language including unit tests which contain example input-output testing pairs corresponding to the problem specification and a corresponding code segment that solves a problem described in the problem specification;

finetuning the language model that has been pretrained on language tasks to generate code programs based on the problem specification and using the corresponding code segment as a ground truth;

generating, by the finetuned pretrained language model acting as the actor model, one or more tokens representing a sampled code program in response to the problem specification at a decoding time step;

compiling, by the one or more processors, the sampled code program comprising the one or more tokens at a compiling environment and executing the sampled code program with a testing input from the unit tests to generate an execution result;

generating, by the critic model, a return indicating functional correctness of the sampled code program based on comparing the execution result of the sampled code program and a testing result of the problem specification;

computing a policy gradient of an expectation of the return given current parameters of the finetuned pretrained language model;

updating the current parameters of the finetuned pretrained language model according to the policy gradient; and generating, by the finetuned pretrained language model having the updated current parameters, a repaired code program that repairs the sampled code program based on an input combining the problem specification, the sampled code program and the execution result of the sampled code program.

* * * * *